United States Patent
Takeshita

(10) Patent No.: US 8,417,027 B2
(45) Date of Patent: Apr. 9, 2013

(54) DOCUMENT COLOR DETERMINING APPARATUS, IMAGE PROCESSING APPARATUS, DOCUMENT COLOR DETERMINING METHOD AND COMPUTER READABLE MEDIUM STORED DOCUMENT COLOR DETERMINING PROGRAM

(75) Inventor: Go Takeshita, Shizuoka (JP)

(73) Assignee: NEC Access Technica, Ltd, Shizuoka (JP)

( * ) Notice: Subject to any disclaimer, the term of this patent is extended or adjusted under 35 U.S.C. 154(b) by 260 days.

(21) Appl. No.: 12/873,785

(22) Filed: Sep. 1, 2010

(65) Prior Publication Data

US 2011/0052051 A1 Mar. 3, 2011

(30) Foreign Application Priority Data

Sep. 2, 2009 (JP) ................................ 2009-202233
Aug. 24, 2010 (JP) ................................ 2010-187015

(51) Int. Cl.
*G06K 9/00* (2006.01)
*G06K 9/34* (2006.01)

(52) U.S. Cl.
USPC ....................................................... 382/165

(58) Field of Classification Search ................. 382/164, 382/165, 173, 199, 205, 254, 275, 291; 348/606; 358/515, 531; 345/440, 473
See application file for complete search history.

(56) References Cited

U.S. PATENT DOCUMENTS

| | | | | |
|---|---|---|---|---|
| 6,674,904 | B1 * | 1/2004 | McQueen | 382/199 |
| 7,039,222 | B2 * | 5/2006 | Simon et al. | 382/118 |
| 7,265,755 | B2 * | 9/2007 | Peterson | 345/440 |
| 7,873,219 | B2 * | 1/2011 | Friedhoff | 382/199 |
| 8,126,264 | B2 * | 2/2012 | Kaftory et al. | 382/165 |
| 2011/0052051 | A1 * | 3/2011 | Takeshita | 382/165 |
| 2011/0085738 | A1 * | 4/2011 | Kitamura et al. | 382/199 |

FOREIGN PATENT DOCUMENTS

| | | |
|---|---|---|
| JP | 2001-036752 A | 2/2001 |
| JP | 2007-116419 A | 5/2007 |

\* cited by examiner

*Primary Examiner* — Amir Alavi
(74) *Attorney, Agent, or Firm* — Sughrue Mion, PLLC

(57) ABSTRACT

A color determining apparatus which determines whether an document is a color document or a monochrome document based on image data of the document including a plurality of pixel data, includes a pixel color determination part which performs color determination of pixels based on a luminance component value and a color component value of the pixel data; a pixel color re-determination part which set one of the pixels determined to be a color pixel by the pixel color determination part a target pixel in turn, and at a time when a plurality of filters having different outline shapes are applied to the target pixel, performs color re-determination of the target pixel according to whether all of the pixels included in the filter are determined to be color pixels or not by the pixel color determination part; and a first document color determination part that determines whether the document is color or monochrome by comparison of a number of the pixels determined to be color pixels by the pixel color re-determination part and a reference value set in advance.

10 Claims, 17 Drawing Sheets

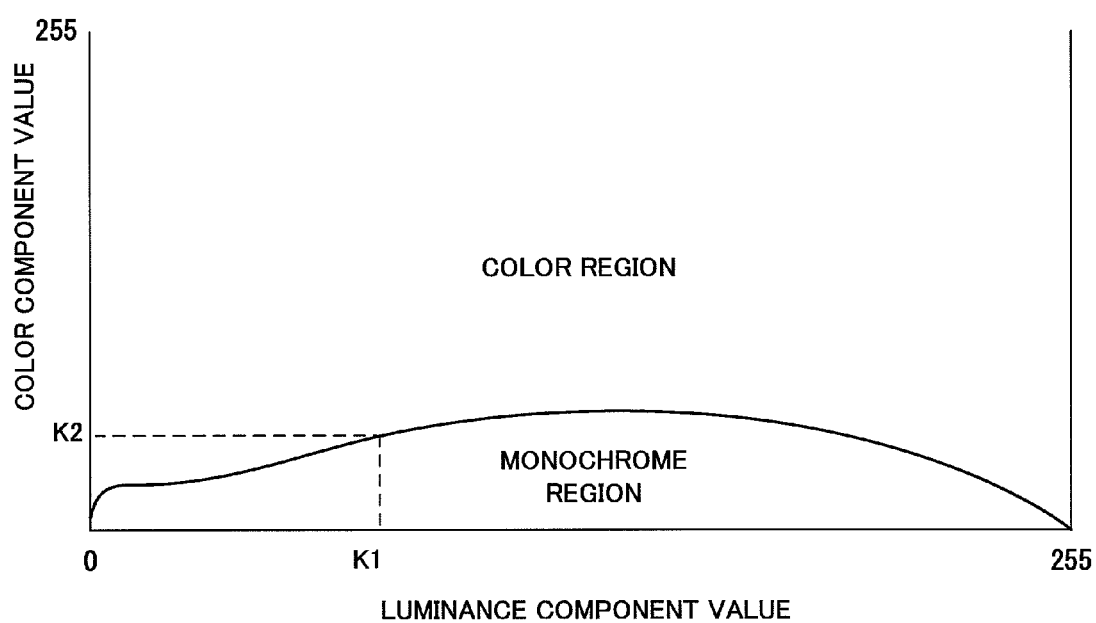

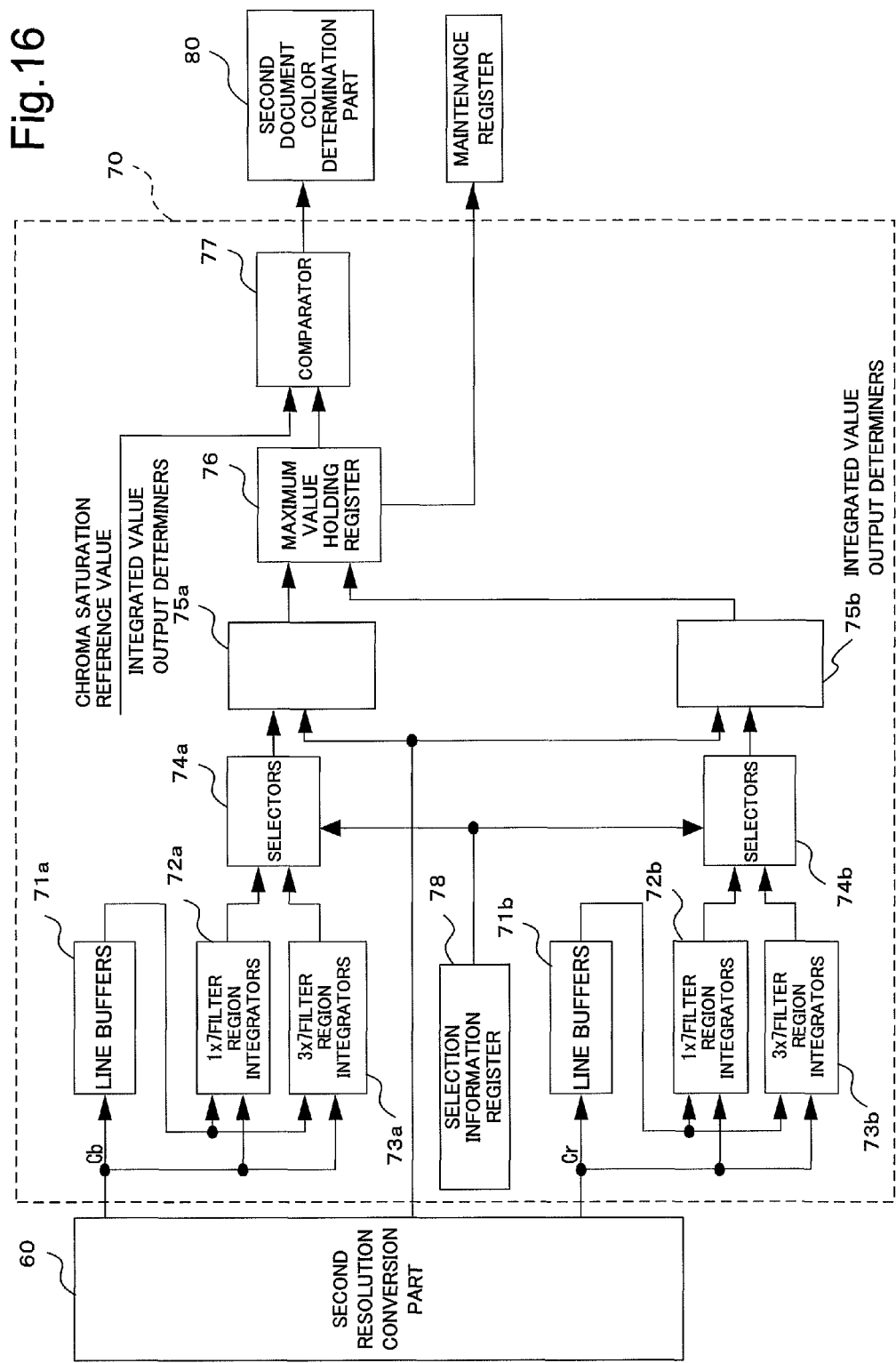

Fig.17B

| Cb(0, 2) Cr(0, 2) | Cb(1, 2) Cr(1, 2) | Cb(2, 2) Cr(2, 2) | Cb(3, 2) Cr(3, 2) | Cb(4, 2) Cr(4, 2) | Cb(5, 2) Cr(5, 2) | Cb(6, 2) Cr(6, 2) |
|---|---|---|---|---|---|---|
| Cb(0, 1) Cr(0, 1) | Cb(1, 1) Cr(1, 1) | Cb(2, 1) Cr(2, 1) | Cb(3, 1) Cr(3, 1) | Cb(4, 1) Cr(4, 1) | Cb(5, 1) Cr(5, 1) | Cb(6, 1) Cr(6, 1) |
| Cb(0, 0) Cr(0, 0) | Cb(1, 0) Cr(1, 0) | Cb(2, 0) Cr(2, 0) | Cb(3, 0) Cr(3, 0) | Cb(4, 0) Cr(4, 0) | Cb(5, 0) Cr(5, 0) | Cb(6, 0) Cr(6, 0) |

Fig.17A

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 |
| 0 | 0 | 0 | 0 | 0 | 1 | 1 | 1 | 0 | 0 | 0 | 0 |
| 0 | 0 | 0 | 0 | 1 | 1 | 1 | 0 | 0 | 0 | 0 | 0 |
| 0 | 0 | 0 | 0 | 1 | 1 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

J

DOCUMENT COLOR DETERMINING APPARATUS, IMAGE PROCESSING APPARATUS, DOCUMENT COLOR DETERMINING METHOD AND COMPUTER READABLE MEDIUM STORED DOCUMENT COLOR DETERMINING PROGRAM

This application is based upon and claims the benefit of priority from Japanese Patent Application No. 2009-202233, filed on Sep. 2, 2009, the disclosure of which is incorporated herein in its entirety by reference.

TECHNICAL FIELD

The present invention relates to a color determining apparatus, an image processing apparatus, a color determining method and a color determining program, which can determine whether a read document is a color document or a monochrome document with a high degree of accuracy.

BACKGROUND ART

In a general color automatic determining method used in an image processing apparatus, monochrome/color determination (hereinafter, described as color determination) is performed in pixel units to a document which has been read. The color determination of a document is performed by an integrated value of the number of pixels determined as color.

For example, in Japanese Patent Application Laid-Open Publication No. 2001-036752, there is disclosed an image processing apparatus which performs color determination once again to a pixel which has been determined that it is chromatic (color). That is, the number of pixel groups in which a predetermined number of pixels determined to be a color pixel continue in the horizontal scan line and the number of times that such pixel groups continue in the vertical scanning direction by a predetermined number of times are counted, and then it is determined finally whether a document is a color document or a monochrome document based on these values.

Japanese Patent Application Laid-Open Publication No. 2007-116419 discloses an image processing apparatus which makes the influence of a color shift which occurs at the time of reading a document on color determination small by performing down-scaling processing to image data.

In the color automatic determining method mentioned above, color determination of a document is performed by performing color determination about each pixel, and then counting the number of pixels determined to be a color pixel. At that time, because substantial color determination processing is performed only in the first color determination, when noise or the like is included in read image data, such pixels might be falsely determined to be a color pixel. Accordingly, there is a problem that a case where a monochrome pixel is determined as a color pixel occurs and thus the determination accuracy of color determination declines.

Further, although various actions such as edge detection processing and foundation removal processing are taken in order to improve the color determination accuracy, such processing causes increase of processing procedures in color determining processing, and thus processing time becomes long.

In addition, about hardware for performing processing such as edge detection processing and foundation removal processing, there is a problem that a circuit and a structure are complicated and large in scale.

SUMMARY

An exemplary object of the present invention is to provide a color determining apparatus, an image processing apparatus, a color determining method and a color determining program which can perform color determination of a read document with a simple structure and with a high degree of accuracy.

A color determining apparatus which determines whether a document is a color document or a monochrome document based on image data of the document including a plurality of pixel data, includes a pixel color determination part which performs color determination of pixels based on a luminance component value and a color component value of the pixel data; a pixel color re-determination part which set one of the pixels determined to be a color pixel by the pixel color determination part a target pixel in turn, and at a time when a plurality of filters having different outline shapes are applied to the target pixel, performs color re-determination of the target pixel according to whether all of the pixels included in the filter are determined to be color pixels or not by the pixel color determination part; and a first pixel color determination part that determines whether the document is color or monochrome by comparison of a number of the pixels determined to be color pixels by the pixel color re-determination part and a reference value set in advance.

BRIEF DESCRIPTION OF THE DRAWINGS

Exemplary features and advantages of the present invention will become apparent from the following detailed description when taken with the accompanying drawings in which:

FIG. 2 is a diagram showing a graphed look-up table for color determination according to the first exemplary embodiment;

FIG. 16 is a detailed block diagram of an indefinite image determination part according to the third exemplary embodiment;

FIG. 17A is a diagram showing a map of a color flag for secondary determination according to the third exemplary embodiment;

FIG. 17B is a diagram showing chroma saturation expressions related to each converted pixel according to the third exemplary embodiment.

EXEMPLARY EMBODIMENT

An exemplary embodiment of the present invention will be described. Meanwhile, the present invention is not limited to exemplary embodiments described below, and various modifications are possible within a range that a person skilled in the art can implement easily.

First Exemplary Embodiment

Figure 1:
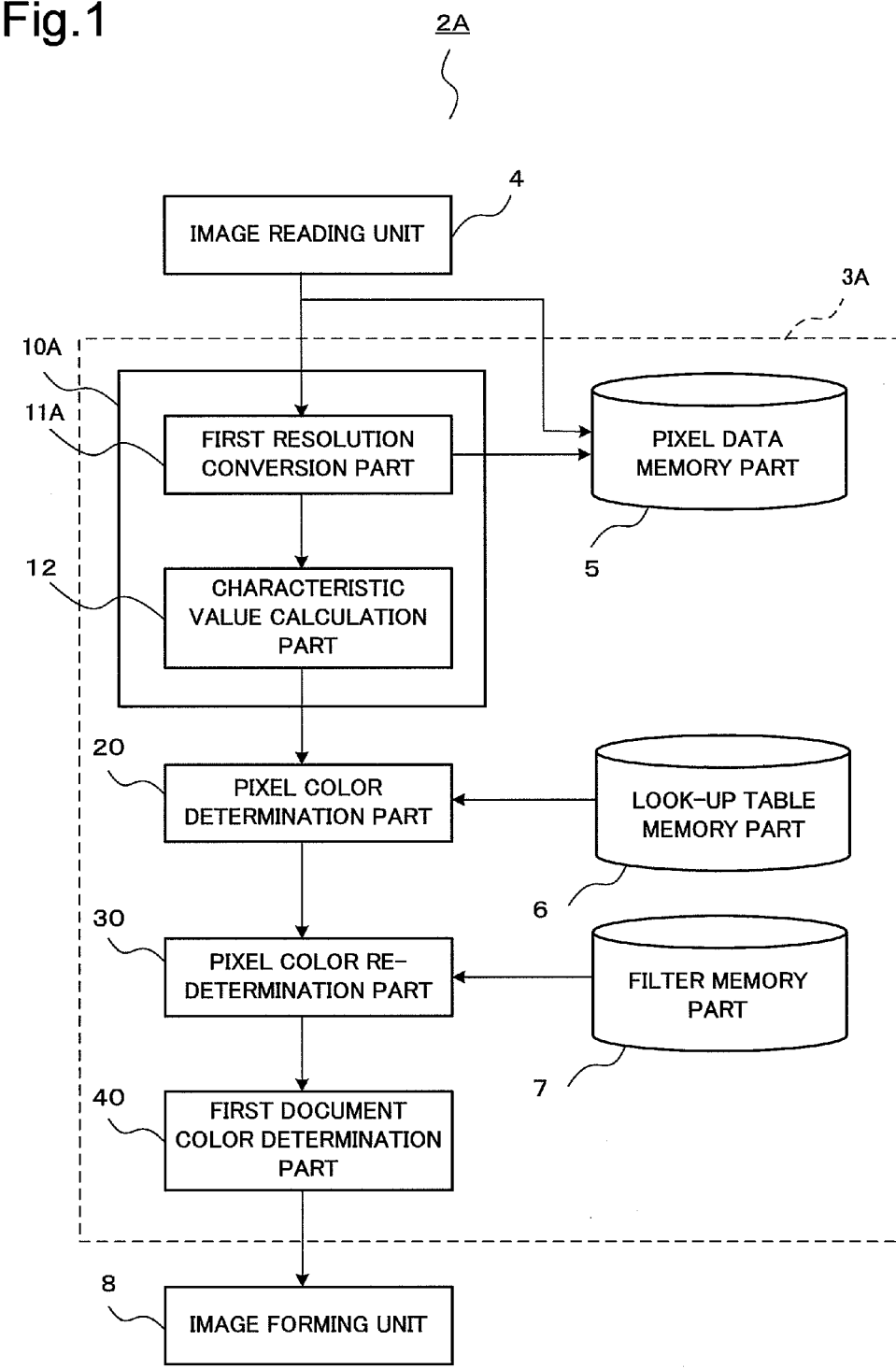
FIG. 1, a block diagram of an image processing apparatus according to a first exemplary embodiment of the present invention.

FIG. 1 is a block diagram of an image processing apparatus 2A according to the first exemplary embodiment of the present invention. This image processing apparatus 2A includes an image reading unit (image reading part) 4 which reads information of a document, a color determining apparatus 3A which performs color determination of the document and an image forming unit (an image printout part) 8 which performs image forming.

The image reading unit 4 has a reading device such as a scanner and reads information of the document, and outputs it as image data. Meanwhile, there may be a case where various kinds of processing such as shading compensation, correction of chromatic aberration, correction between lines, gamma (γ) correction, foundation removal and scaling are performed arbitrarily at the time of acquiring image data or to image data which has been acquired. Image data consists of a number of pixel data.

In color determining processing by the color determining apparatus 3A, processing to convert image data acquired by the image reading unit 4 into data of a low resolution is included. Accordingly, image data and pixels before and after resolution conversion are different, respectively. Therefore, in the following description, image data acquired by the image reading unit 4 is described as initial image data, and image data which is made by performing low resolution conversion to the initial image data is described as converted image data. According to this notation, a pixel of initial image data is described as an initial pixel and a pixel of converted image data is described as a converted pixel. When they are not classified specifically, it is described as image data and a pixel.

The color determining apparatus 3A determines whether the document is a color document or a monochrome document based on initial image data. Although the color determining apparatus 3A can be composed by dedicated hardware, it is also possible to program a color determining procedure and carry out it on a program control processor or the like. When the color determining procedure is programmed, it is possible to record it in the recording medium or deliver it by a communication means to use it.

The image forming unit 8 performs image forming based on initial image data or converted image data. On this occasion, the image forming is performed according to a determination result of the color determining apparatus 3A as a general rule, and when designation of color or monochrome forming is made by a user or the like, according to this designation.

The color determining apparatus 3A mentioned above includes a resolution conversion unit 10A, a pixel color determination part (color/monochrome determination part) 20, a pixel color re-determination part (collar/monochrome re-determination part) 30, a first document color determination part (counting and last determination part) 40, a pixel data memory part 5, a look-up table memory part 6, a filter memory part 7 and the like. The resolution conversion unit 10A includes a first resolution conversion part (smoothing and sampling part) 11A and a characteristic value calculation part (pixel data processing part) 12.

Initial image data from the image reading unit 4 is stored in the pixel data memory part 5, and at the same time, it is inputted to the resolution conversion unit 10A. The color determining apparatus 3A performs color determination by the following schematic procedure. First, the first resolution conversion part 11A converts initial image data into converted image data of a low resolution. Next, the characteristic value calculation part 12 calculates a luminance component value and a color component value of each converted pixel.

The pixel color determination part 20 performs color determination of each converted pixel using these two component values of the luminance component value and the color component value. Further, the pixel color re-determination part 30 performs color re-determination using a plurality of filters to each converted pixel which has been determined to be a color pixel by the pixel color determination part 20. Finally, the first document color determination part 40 performs the final determination of whether the document is the color document or the monochrome document based on the number of converted pixels determined to be the color pixel by the pixel color re-determination part 30. The image forming unit 8 forms a color or a monochrome image according to document color determination of the color determining apparatus 3A.

Next, the detailed configuration of the above-mentioned color determining apparatus 3A will be described. Initial image data from the image reading unit 4 is stored in the pixel data memory part 5, and inputted to the first resolution conversion part 11A as well.

The first resolution conversion part 11A generates converted image data of the resolution lower than that of the initial image data by performing smoothing processing and sampling processing of R (Red), G (Green) and B (Blue) values of each converted pixel. The generated converted image data is stored in the pixel data memory part 5 and is outputted to the characteristic value calculation part 12 as well.

By converting into converted image data of a lower resolution than that of initial image data, even when image deformation such as a color shift occurs at the time of reading the document, color determination becomes less subject to such image deformation. Also, because the number of pixels that become a color determination object is reduced, the processing load required for color determining processing is reduced. Meanwhile, converted image data stored in the pixel data memory part 5 can be used as data for image forming for forming a scaling image.

The characteristic value calculation part 12 calculates the luminance component value and the color component value from R, G, B values of each converted pixel. At that time, let the average value of the R, G, B values be the luminance component value. In addition, let the larger one of the difference values between the R value and the G value and the difference value between the R value and the B value be the color component value. Of course, a calculation method of the luminance component value and the color component value is not limited to the above-mentioned average value and the difference value.

The pixel color determination part 20 refers to a look-up table stored in advance in the look-up table memory part 6 and performs color determination of each converted pixel based on two component values, the luminance component value and the color component value, which have been calculated by the characteristic value calculation part 12. Hereinafter, the converted pixel which has become a determination object in color determining processing is called a target pixel. Because converted image data includes a plurality of converted pixel data, the number of target pixels corresponds to the number of converted pixels. That is, color determination is performed by the number of converted pixels.

FIG. 2 is a diagram which graphs a look-up table stored in the look-up table memory part 6. Hereinafter, a graphed look-up table is called a lookup curve. The horizontal axis of FIG. 2 indicates the luminance component value and vertical axis the color component value. An area in the higher color component value side having the lookup curve K as a boundary corresponds to a color region, and an area in the lower color component value side corresponds to a monochrome region.

Meanwhile, it is possible to provide a plurality of such look-up tables corresponding to a kind of documents, and to use them by selecting appropriately. For example, in a recycled paper, a newspaper and the like, a foundation is often tinted. In such the document, by using a look-up table according to a foundation color, correct color determination can be performed.

The pixel color re-determination part 30 performs color re-determination to the converted pixel which has been determined to be the color by the pixel color determination part 20 using at least one filter among a plurality of filters having different profile shapes stored in the filter memory part 7 in advance.

Figure 3A:
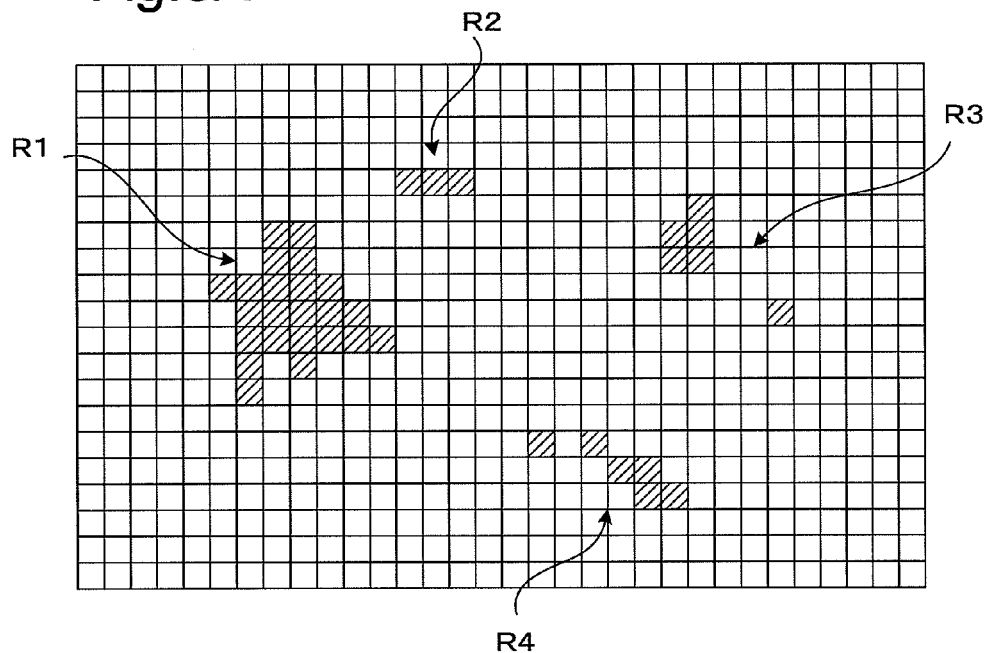
FIG. 3A is a map of pixels which have been determined as a color pixel by a pixel color determination unit according to the first exemplary embodiment.
Figure 3B:
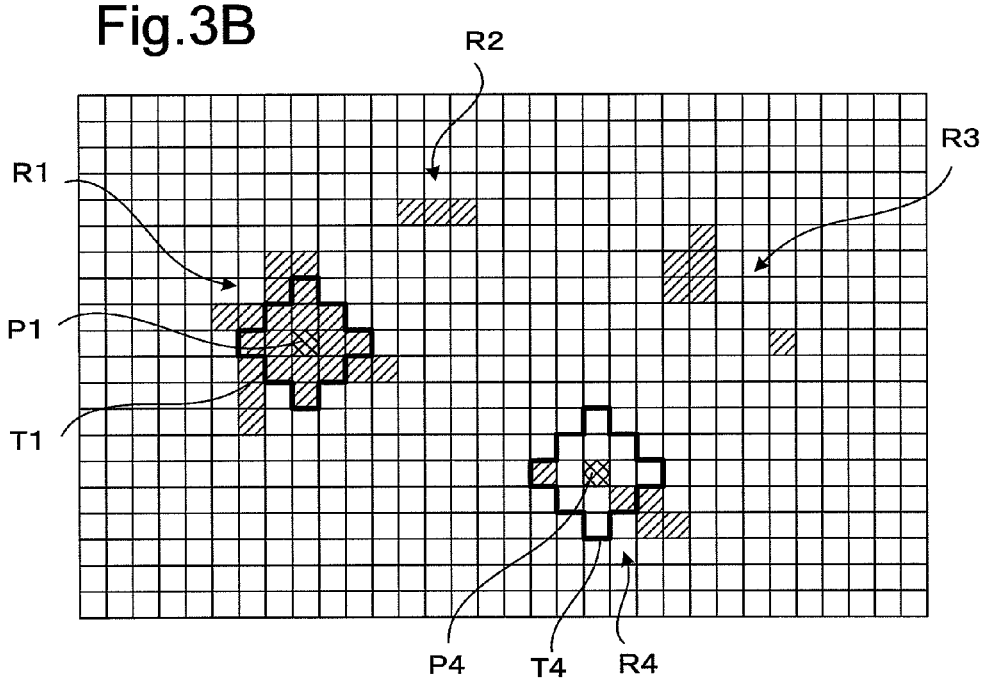
FIG. 3B is a diagram showing that a rhomboid-shaped filter has been applied to the pixel map of FIG. 3A according to the first exemplary embodiment.

Color re-determination processing using a filter will be described with reference to FIG. 3. FIG. 3A is a pixel map in which the converted pixel determined to be the color pixel by the pixel color determination part 20 is indicated by a hatching so that it may be distinguished. FIG. 3B is a diagram to which the filter having a rhombic profile shape has been applied to this pixel map.

In FIG. 3A and FIG. 3B, the hatched areas are divided into determination areas R1-R4 for convenience of explanation. In FIG. 3B, the converted pixel having a cross hatching indicates the converted pixel which is being a target (target pixel) of color re-determination. In FIG. 3B, indicated by thick solid lines are outlines T1 and T4 of a rhomboid-shaped filter which have been applied when one converted pixel P1 within the determination area R1 and one converted pixel P4 within the determination area R4 are assigned as target pixels.

The pixel color re-determination part 30 determines whether all converted pixels included within the outlines T1, T4 of the rhomboid-shaped filter are determined to be the color pixel by the pixel color determination part 20. When following the way of expression of FIG. 3B, the color re-determination will determine whether all converted pixels within the outlines T1, T4 are hatched or not.

On this occasion, it is also possible to express whether a pixel is determined by the pixel color determination part 20 to be the color pixel or not by a flag. For example, a flag "1" is set to the converted pixel determined to be the color pixel and "0" to the converted pixel determined to be a monochrome pixel. In FIG. 17 A mentioned later, a color determination result is expressed by the flag as an alternative to the hatching.

Now, in FIG. 3B, when a rhomboid-shaped filter is applied taking the converted pixel P1 in the determination area R1 as the target pixel, the all converted pixels included in the outline T1 are determined by the pixel color determination part 20 as color pixels. Accordingly, the pixel color re-determination part 30 determines the converted pixel P1 to be the color pixel.

On the other hand, when a rhomboid-shaped filter is applied making the converted pixel P4 of the determination area R4 to be the target pixel, not all converted pixels included in the outline T4 are determined to be the color pixel by the pixel color determination part 20. That is, converted pixels which are not hatched are included in converted pixels included in the outline T4. Accordingly, the pixel color re-determination part 30 determines the converted pixel P4 to be the monochrome pixel.

As described above, because the pixel color re-determination part 30 performs color re-determination to the converted pixel which has been determined to be the color pixel by the pixel color determination part 20, the color determination accuracy improves. In particular, because performing color re-determination by applying the filter with a predetermined profile shape means that color relation between the target pixel which is a target of color re-determination and surrounding converted pixels adjacent to this target pixel will be taken in color determination, even if the converted pixel including influence of such as a noise is determined to be the color pixel by the pixel color determination part 20, it can be determined correctly as the monochrome image from the surrounding converted pixels.

By the way, color determination by the filter depends on a profile shape of the filter to be used greatly. Accordingly, the color determination is performed a plurality of times using a plurality of filters having different profile shapes to an identical pixel. As a result, the decision precision of the color determination improves.

Figure 4:
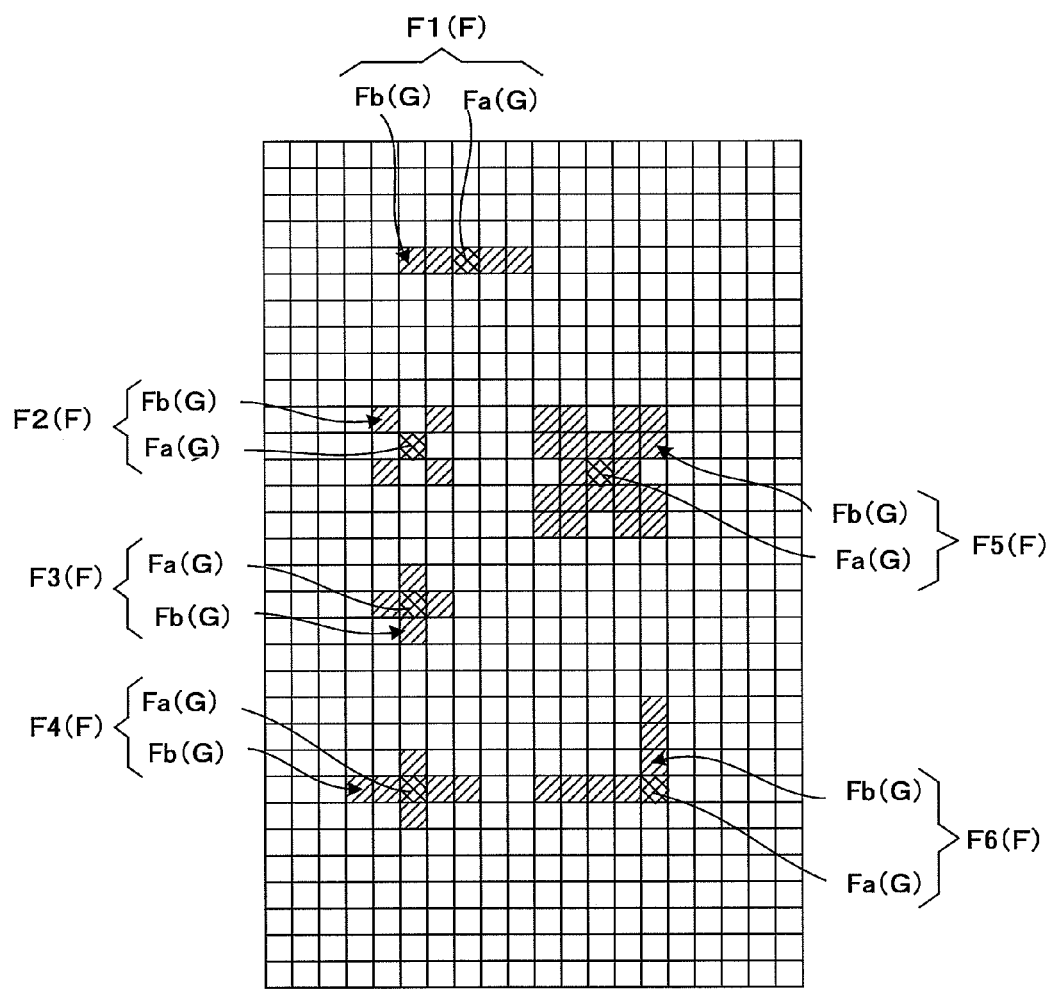
FIG. 4 is a diagram illustrating filters which are stored in a filter memory unit according to the first exemplary embodiment.

FIG. 4 is a diagram illustrating filters F (F1-F6) stored in the filter memory part 7. In FIG. 4, an area formed by a hatching indicates each filter F1-F6. Each of filters F includes one pixel region Fa and a plurality of pixel regions Fb. The pixel region Fa is a pixel region corresponding to the target pixel, and the pixel regions Fb are areas corresponding to peripheral pixels of the target pixel. It is preferred to use each of the filters F1-F6 according to the feature of an image of the document.

For example, in a case of a color thin line, the image has a one-dimensional shape. Accordingly, the filters F1, F2 and F6 with a one-dimensional profile shape are used to the image with such feature. In a case like a picture, the image has a two-dimensional expanse. Accordingly, filters F3, F4 and F5 with a two-dimensional profile shape are used to the image with such feature. Additionally, in a case of a typed image, the filter with a shape according to its feature is used.

Accordingly, even when the image is determined as the color pixel because of existing noises, image deformation or the like although in reality it is the monochrome image, for example, it can be determined now correctly as the monochrome image by using the filter according to the feature of the image.

In addition, when color determination is performed using a plurality of filters, even when being determined to be the monochrome image also by color re-determination using one filter, by using another filter, there is a case where it can be determined as a color image. That is, filter-profile-shape dependence of color determination result is suppressed by performing color re-determination using a plurality of filters having different profile shapes.

For example, in a case of color determination of a special image having only color thin lines, when it is performed using the filter F5 shown in FIG. 4, determination indicating the monochrome pixel is often made. However, if color determination is performed using the filter F1, proper color determination can be performed for even such image.

Thus, color determination accuracy improves because the pixel color re-determination part 30 performs color re-determination to the converted pixel which has been determined to be the color pixel by the pixel color determination part 20.

Further, when it is known that the document is of a special kind in advance, color determination accuracy is improved by selecting the filter suitable for this document to perform color determination.

The first document color determination part 40 counts the number of converted pixels determined as the color pixel by the pixel color re-determination part 30, and determines that it is the color document when the count value is no smaller than a color reference value set in advance.

The image forming unit 8 reads initial image data stored in the pixel data memory part 5 and carries out color printing or monochrome printing based on a determination result by the first document color determination part 40. At that time, when printing is made by such as scaling down an image, converted image data is used.

Figure 5:
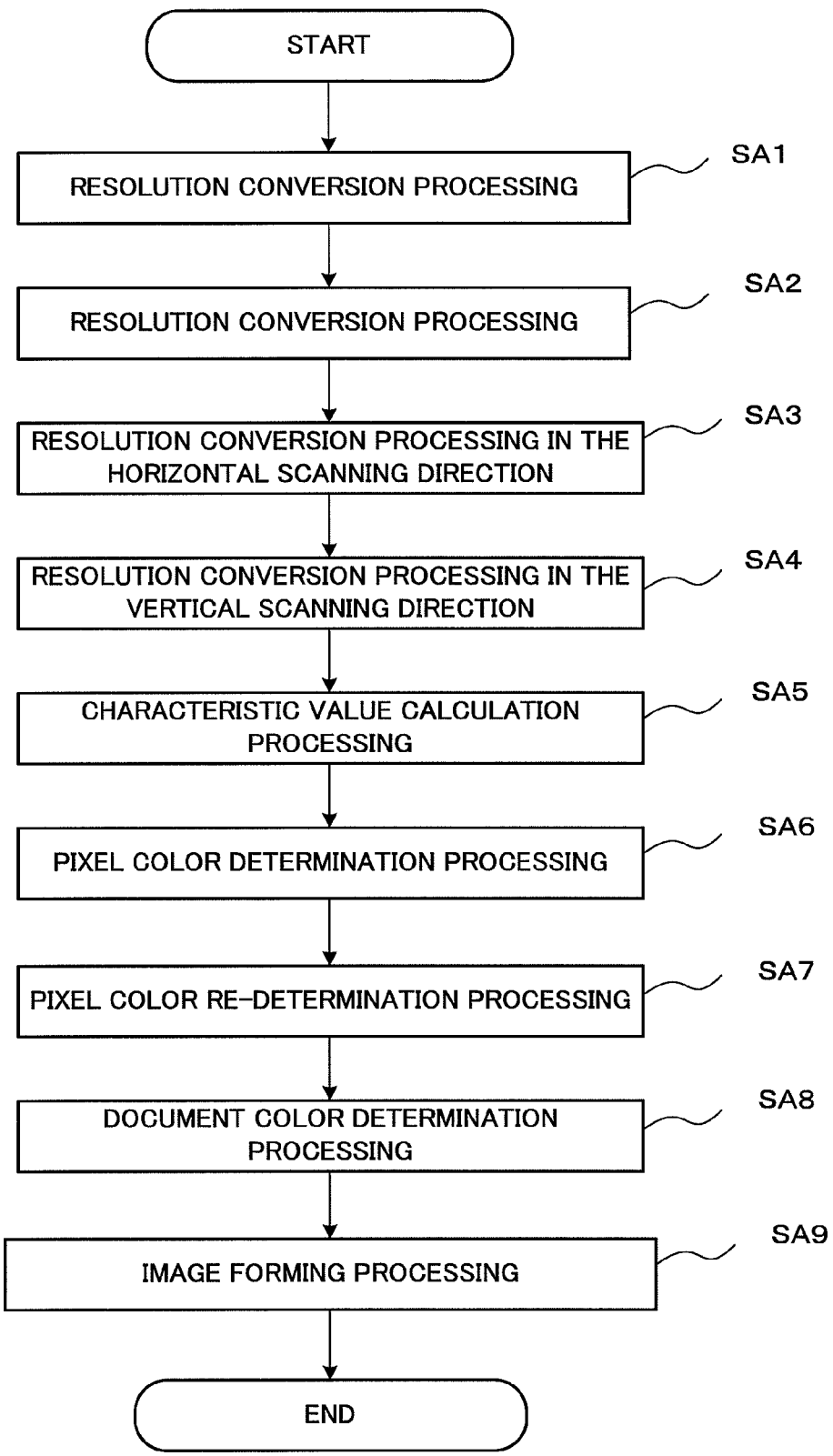
FIG. 5 is a flow chart which shows an image processing procedure according to the first exemplary embodiment.

Next, an image processing procedure of the image processing apparatus 2A mentioned above will be described with reference to the flow chart of FIG. 5. Meanwhile, hereinafter, description will be made taking a case where the image reading unit 4 reads the document with the resolution of 600 dpi in both the horizontal scanning direction and the vertical scanning direction as an example.

Step SA1: First, the document is read by the image reading unit 4. The image information on the read document is stored in the pixel data memory part 5 as initial image data, and is outputted to the first resolution conversion part 11A as well. This initial image data is data with the resolution of 600 dpi in the horizontal scanning direction and the vertical scanning direction.

Step SA2: Then, from the initial image data, the first resolution conversion part 11A generates converted image data of the resolution lower than the initial image data. For example, average values of the R, G, B values of four pixels (two pixels in height×two pixels in width) are calculated, and let the average values be R, G, B values of that area of "two pixels in height×two pixels in width". By this, because the "two×two pixels" become to have R, G, B values of same numerical values, "the two×two pixels" can be made be one converted pixel. As a result, converted image data having a converted resolution of 300 dpi in the horizontal scanning direction and 300 dpi in the vertical scanning direction can be generated.

Step SA3, SA4: Next, the first resolution conversion part 11A converts the resolution of the converted image data in the horizontal scanning direction and the vertical scanning direction from 300 dpi into 100 dpi. As a method of the resolution conversion, there can be illustrated a method to calculate a weighted average of five lines/column including two lines/column in the left and two lines/column in the right, and to perform sampling for each three lines/column, for example.

Converted image data of 100 dpi obtained in this way is stored in the pixel data memory part 5. Meanwhile, by storing converted image data in the pixel data memory part 5, it becomes possible for the image forming unit 8 to perform image forming based on this converted image data. By such resolution conversion, deterioration of determination accuracy of color determination caused by image deformation which occurs at the time of reading the document can be suppressed, and at the same time, the processing load for color determination can be mitigated because the number of pixels which are color determination objects is reduced.

Step SA5: Next, the characteristic value calculation part 12 calculates the luminance component value and the color component value from R, G, B values of each converted pixel. Let the luminance component value be an average value of the R, G, B values. Let the larger one of the difference values between the R value and the G value and the difference value between the R value and the B value be the color component value. A calculation method of the luminance component value and the color component value is not limited to the methods mentioned above.

Step SA6: Next, the pixel color determination part 20 performs determination of which region of the color region and the monochrome region zoned by the lookup curve K shown in FIG. 2 the two component values of the luminance component value and the color component value calculated in step SA5 are located.

Step SA7: It is supposed that determination by the pixel color determination part 20 has been performed to the determination areas R1-R4 such as in FIG. 3 A, for example. On this occasion, the pixel color re-determination part 30 reads at least one filter from the filter memory part 7 and performs color re-determination to each converted pixel within the determination areas R1-R4.

Note that, in color re-determination processing, color determination is performed for each converted pixel by taking the converted pixel determined to be the color pixel by the pixel color determination part 20 as the target pixel in turn. At that time, color re-determination is performed to one converted pixel using a plurality of filters having different profile shapes.

Figure 6:
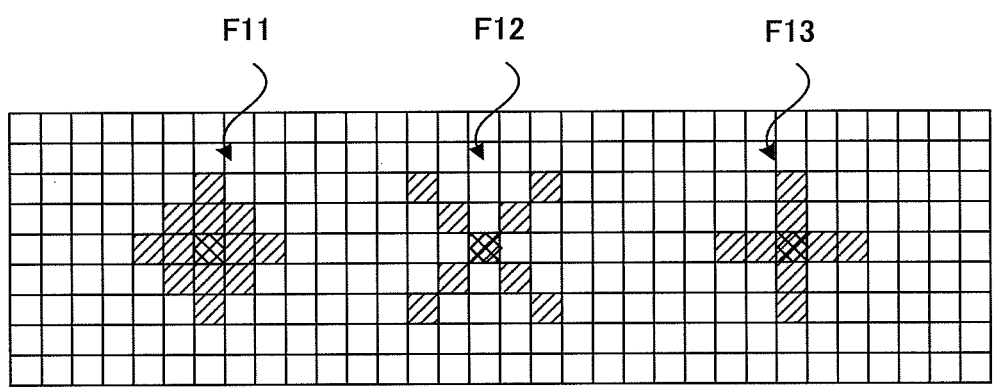
FIG. 6 is a diagram which illustrates a set of filters used for color determination according to the first exemplary embodiment.

FIG. 6 is a diagram showing examples of the filter used when color determination is performed. Hereinafter, for convenience of explanation, filters shown in FIG. 6 are referred to as a rhomboid-shaped filter F11, an X-shaped (cross-shaped) filter F12, a +-shaped (plus-shaped) filter F13.

Figure 7A:
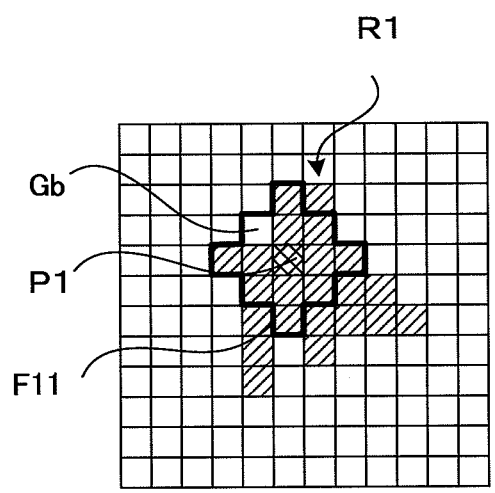
FIG. 7A is a diagram showing that a rhomboid-shaped filter has been applied according to the first exemplary embodiment.
Figure 7B:
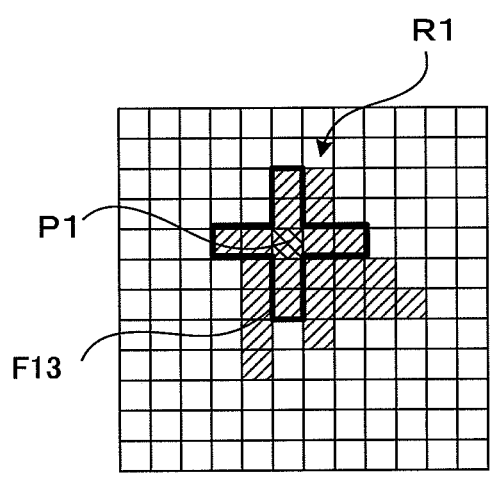
FIG. 7B is a diagram showing that a + shaped filter has been applied according to the first exemplary embodiment.

First, color determination is performed using the rhomboid-shaped filter F11 including five pixels in "height×five pixels in width", for example, taking converted pixels determined to be the color pixel as the target pixel in turn. FIG. 7A and FIG. 7B are diagrams in which the filter F11 and the filter F13 are applied to the determination area R1 shown in FIG. 3B.

At that time, as shown in FIG. 7 A, the converted pixel Gb determined by the pixel color determination part 20 as the monochrome pixel (the converted pixel which is not hatched) exists within the outline of the rhomboid-shaped filter F11. However, there is a high possibility that the converted pixel P1 is the color pixel. That is, when color re-determination is performed using a single filter, false-determination may occur due to a profile shape of the filter. Accordingly, as shown in FIG. 7B, when the +-shaped filter F13 is applied, all converted pixels included in this +-shaped filter F13 are hatched converted pixels. As a result, the converted pixel P1 is determined to be the color pixel correctly.

In order to thus prevent false-determination, after performing color determination using the rhomboid-shaped filter F11, the second determination using the X-shaped filter F12 is performed to the same target pixel, and then, the third color determination is carried out using the +-shaped filter F13 which has a further different profile shape.

When being determined as the color pixel at least once in a plurality of times of color determination, it is determined that this target pixel is the color pixel. As a result, correct color determination becomes possible.

Figure 8:
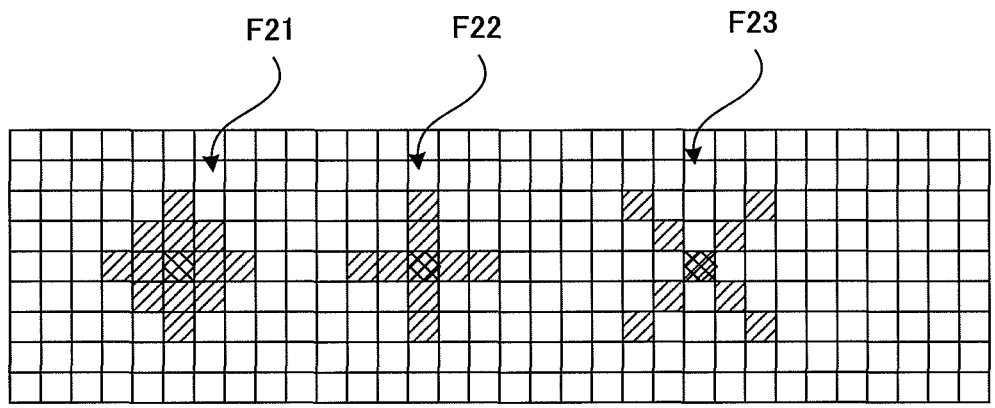
FIG. 8 is a diagram illustrating a filter set which is applied when a document is of a color thin line according to the first exemplary embodiment.
Figure 9:
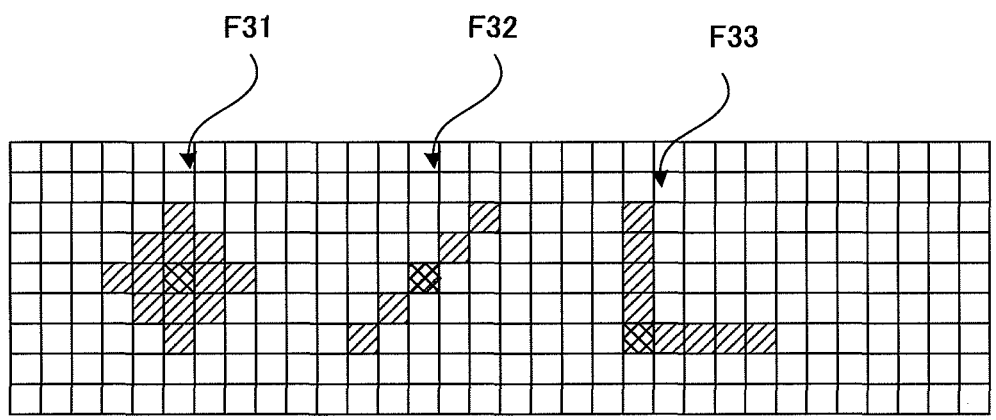
FIG. 9 is a diagram illustrating another filter set which is applied when a document is of a color thin line according to the first exemplary embodiment.

Meanwhile, although color determination is performed using filters F11-F13 as shown in FIG. 6, these filters F11-F13 might not correspond to the feature of the document. For example, when the document is a color thin line, it is preferred to use filters F21-F23 of profile shapes as shown in FIG. 8, and filters F31-F33 of profile shapes as shown in FIG. 9 or the like because the image is one-dimensional. Although a function to judge the feature of the document can be additionally provided in the color determining apparatus 3A or the like, it is also possible that a user designates it.

It is preferred that even a set of filters to be used for color determination of a special type document includes one planar-shaped filter with a two-dimensional expanse in the set. The reason of this is to reduce the effect of color shift which might occur at the time of reading the document on color determination.

Here, a planar-shaped filter with a two-dimensional expanse is the filter which includes a pixel region which surrounds the target pixel like the filter F5 of FIG. 4, the filter F11 of FIG. 6, the filter F21 of FIG. 8 and the filter F31 of FIG. 9. From this meaning, a planar-shaped filter is not limited to a rhomboid-shaped filter.

Step SA8: The first document color determination part 40 counts the number of converted pixels determined to be the color pixel by the pixel color re-determination part 30, and makes final determination that a read document is a color when the count value is no smaller than a predetermined color reference value. For example, when the count value is "1" or more, it is determined as a color, and when it is "0", a monochrome.

Step SA9: The image forming unit 8 reads initial image data or converted image data stored in the pixel data memory part 5, and carries out color or monochrome printing following the final determination of the first document color determination part 40.

As mentioned above, according to this exemplary embodiment, because initial image data is converted into converted image data with a lower resolution in order to perform color determination, a color determining processing load can be reduced and false-determination by a color shift or the like can be prevented. Because the final judgment of whether the document is the color document or not is performed following a plurality of times of color re-determination processing, color determination accuracy improves. In addition, color determination accuracy improves because a plurality of filters having different profile shapes is used in color re-determination. As a result, high-quality image forming becomes possible.

Second Exemplary Embodiment

Next, the second exemplary embodiment of the present invention will be described. Meanwhile, about the same structures as that of the first exemplary embodiment, description will be omitted appropriately using identical codes. In the first exemplary embodiment, the luminance component value and the color component value are calculated from RGB values of each converted pixel, and the pixel color determination part performs color determination based on these luminance component values and color component values. In contrast, in this exemplary embodiment, RGB values of each initial pixel are converted into Y, Cb, Cr values, and color determination is performed based on these Y, Cb, Cr values.

Figure 10:
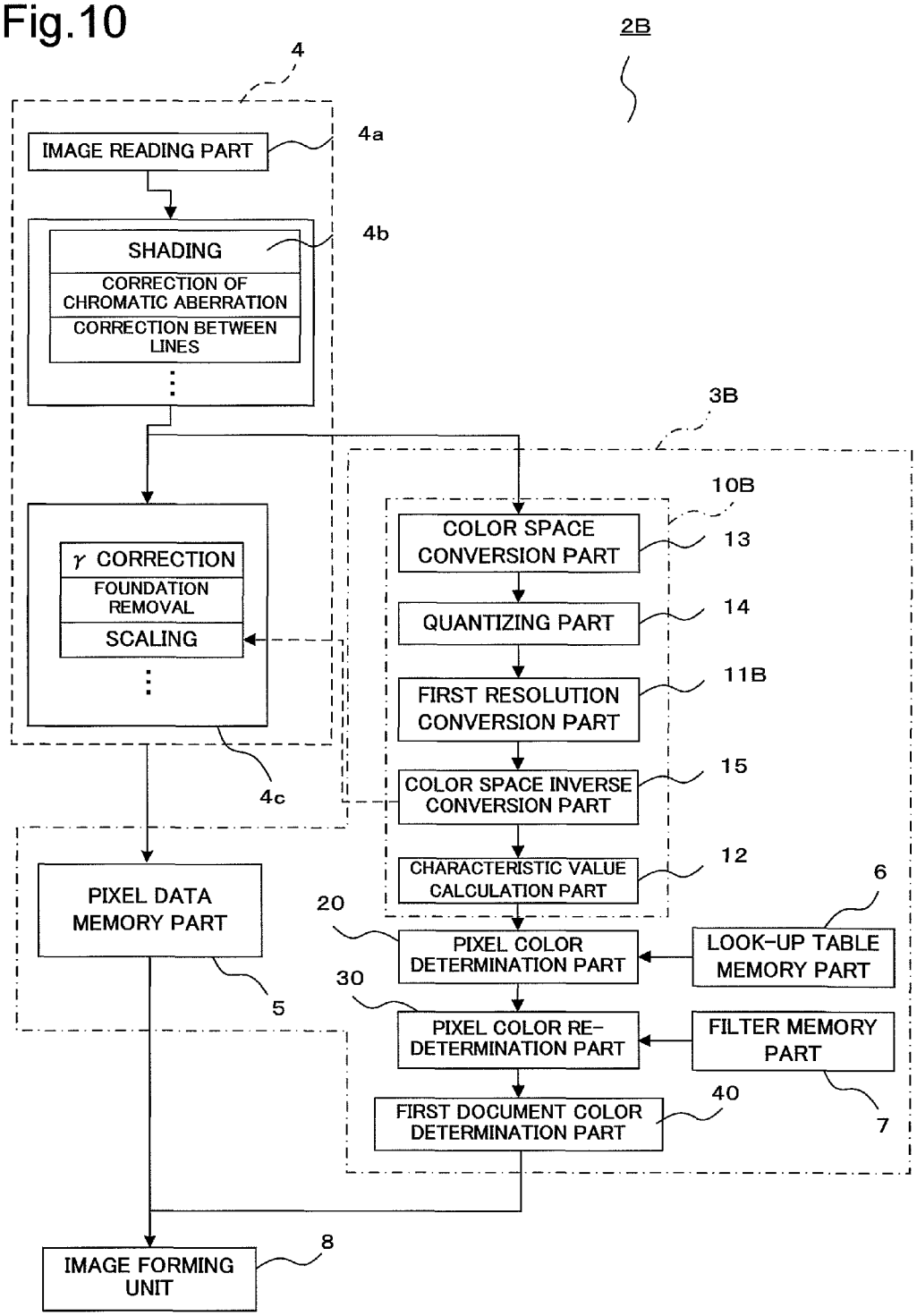
FIG. 10 is a block diagram of an image processing apparatus of a second exemplary embodiment according to the present invention.

FIG. 10 is a block diagram of an image processing apparatus 2B of the second exemplary embodiment according to the present invention. The image processing apparatus 2B includes the image reading unit 4 that acquires image data of the document, a color determining apparatus 3B which performs color determination of the document and the image forming unit 8 that performs image forming.

The image reading unit 4 shown in FIG. 10 is of the same structure as the image reading unit 4 shown in FIG. 1 in the first exemplary embodiment, but it differs in a point that the internal configuration is indicated in detail. That is, as shown in FIG. 10, the image reading unit 4 provides an image reading part 4a including an image sensor and the like, a first data processor 4b that performs shading compensation, correction of chromatic aberration and correction between lines at the time of reading an image, and a second data processor 4c that performs image processing such as gamma ($\gamma$) correction, foundation removal processing and scaling processing to the read image data (initial image data).

It does not matter in which of the first data processor 4b and the second data processor 4c shading compensation and correction of chromatic aberration and the like are included. For example, a structure in which correction of chromatic aberration is included in the second data processor 4c is also fine. Regarding the structure of the second data processor 4c and the color determining apparatus 3B, they do not need to be arranged in parallel, and it may be a structure in which the second data processor 4c and the color determining apparatus 3B are connected in series such that output of the color determining apparatus 3B may be inputted to the second data processor 4c.

The color determining apparatus 3B includes a resolution conversion unit 10B, the pixel color determination part 20, the pixel color re-determination part 30, the first document color determination part 40, the pixel data memory part 5, the look-up table memory part 6 and the filter memory part 7. The resolution conversion unit 10B includes a color space conversion part 13, a quantizing part 14, a first resolution conversion part 11B, a color space inverse conversion part 15 and the characteristic value calculation part 12.

The color space conversion part 13 converts R, G, B values of each initial pixel into Y, Cb, Cr values. While, in the R, G, B color space, a color is being expressed in the form of "a magnitude of values of R, G, B", a color is expressed in the form of "a value of luminance Y and values of color differences Cb and Cr" in the Y, Cb, Cr color space. Accordingly, because they are different in an expression of a same color space, mutual transformation is possible between R, G, B values and Y, Cb, Cr values.

The quantizing part 14 quantizes Cb, Cr values of each initial pixel obtained by the color space conversion part 13. Here, a case where a Y value is quantized in 8 bits, and Cb, Cr values are quantized in 4 bits respectively will be described. By thus quantizing initial image data, the load of color determining processing is reduced.

The first resolution conversion part 11B converts the resolution of quantized initial image data in the horizontal scanning direction and the vertical scanning direction into 100 dpi according to resolution conversion processing which the first resolution conversion part 11A of the first exemplary embodiment performs. By this, even if image deformation or the like occurs at the time of reading the document, influence by the deformation on color determination can be suppressed, and at the same time, the processing load of color determining processing is reduced due to reduction of the number of pixels.

The color space inverse conversion part 15 converts Y, Cb, Cr values of each converted pixel in converted image data outputted by the first resolution conversion part 11B into R, G, B values.

Color determination described in the first exemplary embodiment can be performed based on converted image data to which the resolution conversion has been performed in this way.

Third Exemplary Embodiment

Next, the third exemplary embodiment of the present invention will be described. Meanwhile, about the same structures as the first exemplary embodiment and the second exemplary embodiment, description will be omitted appropriately using identical codes.

Figure 11:
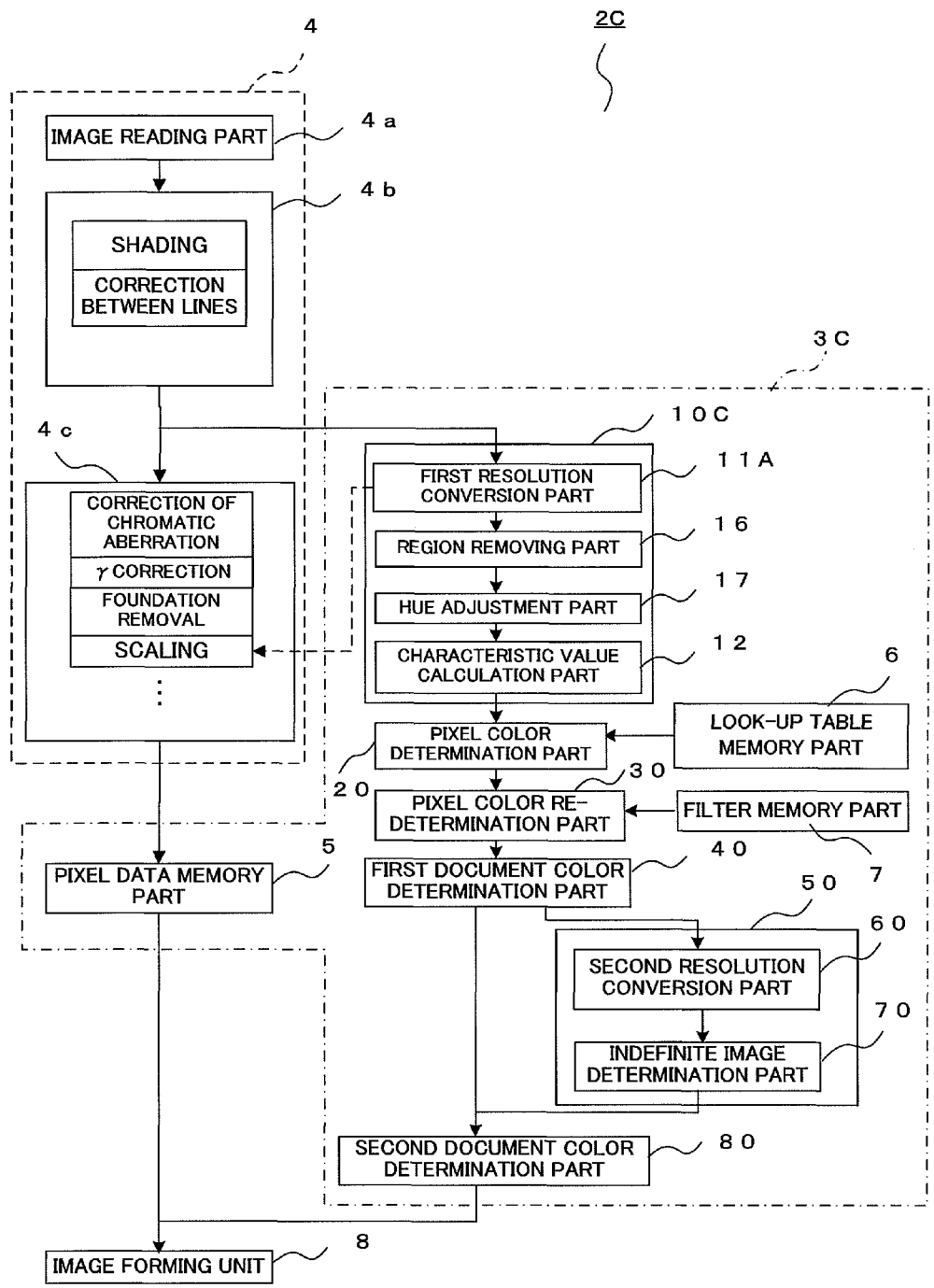
FIG. 11 is a block diagram of an image processing apparatus of a third exemplary embodiment according to the present invention.

FIG. 11 is a block diagram of an image processing apparatus 2C according to this exemplary embodiment. The image processing apparatus 2C includes the image reading unit 4 that reads an image of the document, a color determining apparatus 3C which performs color determination and the image forming unit 8 that performs image forming.

The color determining apparatus 3C includes a resolution conversion unit 10C, the pixel color determination part 20, the pixel color re-determination part 30, the first document color determination part 40, an indefinite image determination unit 50, a second document color determination part 80, the pixel data memory part 5, the look-up table memory part 6 and the filter memory part 7. The resolution conversion unit 10C includes the first resolution conversion part 11A, a region removing part 16, a hue adjustment part 17 and the characteristic value calculation part 12. The indefinite image determination unit 50 includes a second resolution conversion part 60 and an indefinite image determination part 70.

The first resolution conversion part 11A performs smoothing and sampling processing of the R, G, B values of each initial pixel, and then makes the resolution in the horizontal scanning direction and the vertical scanning direction small from 600 dpi to 100 dpi, for example, and output it as converted image data. For example, averages of R, G, B values in 4 pixels of "two pixels in height×two pixels in width" are taken. Next, calculation of a weighted average of five lines consisting two lines in the left and two lines in the right is performed, sampling is performed skipping adjacent two lines, and the resolution in the horizontal scanning direction and the vertical scanning direction is made be 100 dpi.

Figure 12:
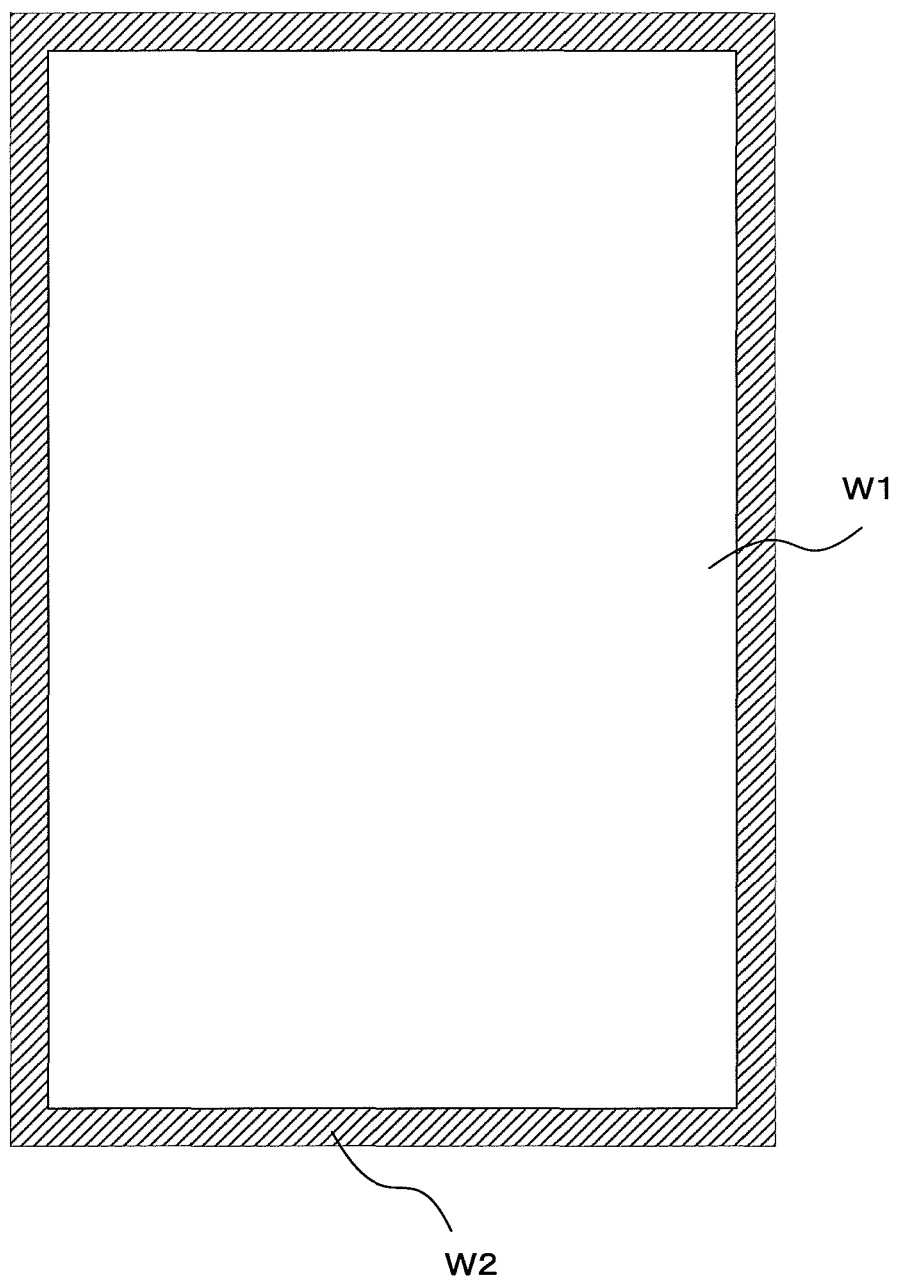
FIG. 12 is a diagram indicating a peripheral region which is removed from converted image data by a region removing part according to the third exemplary embodiment.

The region removing part 16 removes data corresponding to a peripheral region in the read image from the converted image data. FIG. 12 is a diagram in which a peripheral region W2 to be removed from converted image data W1 by the region removing part 16 is hatched. Further, the size of the peripheral region W2 is stored in a register (not illustrated) provided in the region removing part 16 in a manner it can be changed.

It is rare that image information of the document exists to the full extent of the size of the document, and a margin is often set up in the periphery. Accordingly, color determining processing to the peripheral region W2 that is such margin area will be wasteful processing.

When the document is read by the image reading unit 4, there is a case where a paper ends of the document is tilted being not in parallel with the horizontal scanning direction or the vertical scanning direction. When a tilted document is read, a line corresponding to an end of the document may be included in initial image data. Because this line is not the information of the document, when color determining processing is performed to such line image, useless processing is needed and false color determination can be made. Accordingly, by removing data corresponding to the peripheral region W2 of an image from the converted image data W1, the region removing part 16 allows color determining processing to be performed efficiently and color false-determination to be suppressed. Meanwhile, order of the first resolution conversion part 11A and the region removing part 16 may be changed.

In order to correct the bias of color determination for a specific color tendency, the hue adjustment part 17 recalculates R, G, B values in each converted pixel and performs fine adjustment of the hue.

As such hue adjustment methods, the following method is possible. That is, let R, G, B of the converted pixel before hue adjustment be Rin, Gin, Bin, and R, G, B of the converted pixel after hue adjustment be Rout, Gout, Bout and weighting coefficients be Krr, Krg, Krb, Kgr, Kgg, Kgb, Kbr, Kbg, Kbb. Then, the Rout, Gout, Bout values after hue adjustment can be calculated by the following "3×3 matrix" operation.

$$Rout=(Rin \times Krr + Gin \times Krg + Bin \times Krb)/8$$

$$Gout=(Rin \times Kgr + Gin \times Kgg + Bin \times Kgb)/8$$

$$Bout=(Rin \times Kbr + Gin \times Kbg + Bin \times Kbb)/8$$

Let the weighting coefficient are assumed signed real number of 14 bits (fixed point). This weighting coefficient is stored in a register which is not illustrated in advance. Meanwhile, the hue adjustment method in the hue adjustment part 17 is not limited to the method mentioned above.

The R, G, B values of the converted image data to which hue adjustment by the hue adjustment part 17 has been performed are inputted to the characteristic value calculation part 12, and the luminance component value and the color component value of each converted pixel are calculated and inputted to the pixel color determination part 20.

Figure 13:
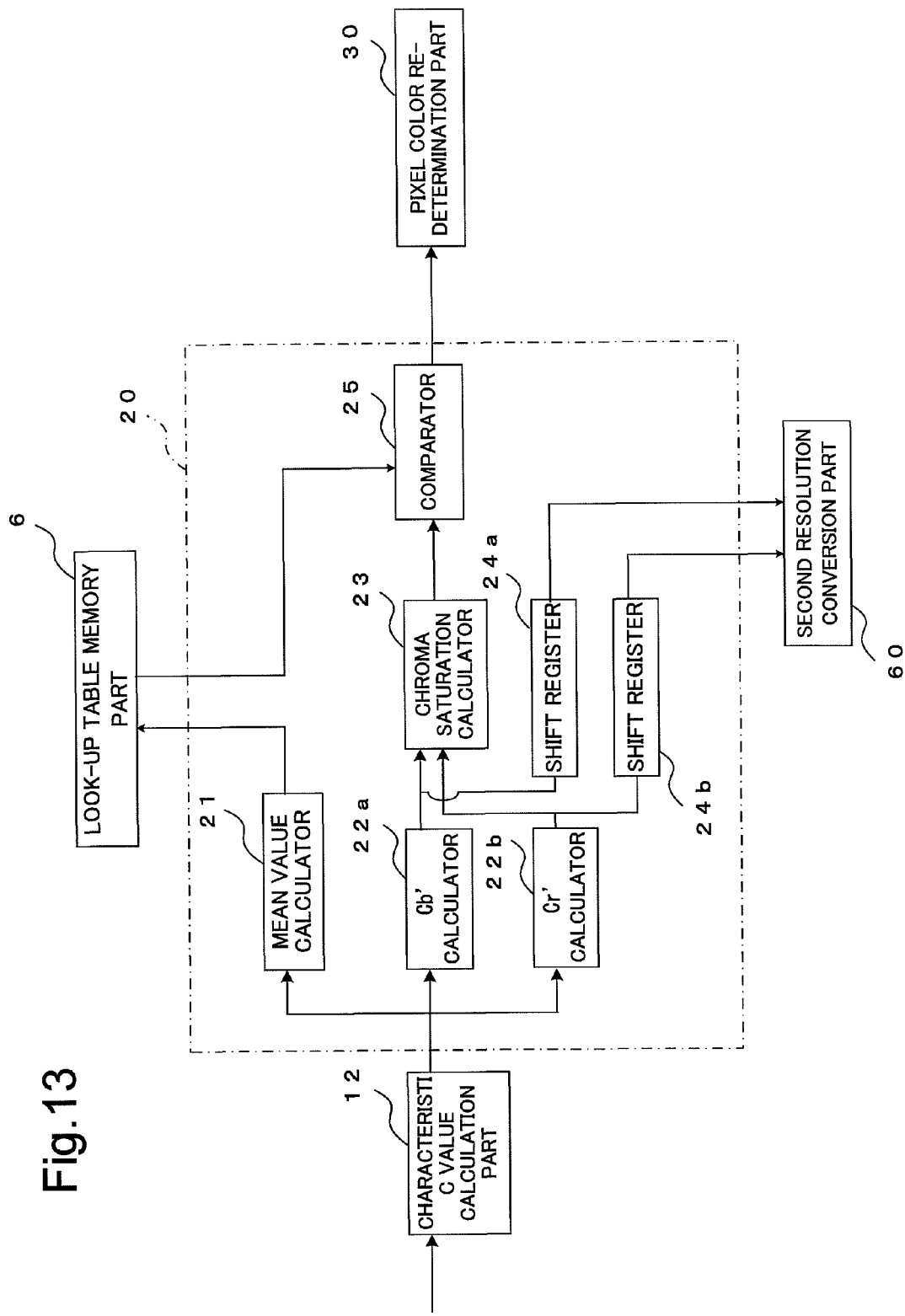
FIG. 13 is a block diagram of a pixel color determination unit according to the third exemplary embodiment.

FIG. 13 is a block diagram of the pixel color determination part 20. The pixel color determination part 20 includes a mean value calculator 21, a Cb' calculator 22a, a Cr' calculator 22b, a chroma saturation calculator 23, shift registers 24a and 24b and a comparator 25.

The mean value calculator 21 calculates the average value of R, G, B from the characteristic value calculation part 12 and makes it be the luminance component value Adr. Then, the look-up table stored in the look-up table memory part 6 is searched for taking the luminance component value Adr calculated by the mean value calculator 21 as an address. The look-up table indicates a corresponding relationship between the luminance component value and the color component value as shown in FIG. 2. And the luminance component value corresponds to an address. Accordingly, designating an address corresponds to designating the luminance component value, and a numerical value stored in this address area will be the color component value. Consequently, the color component value stored in the address area of the luminance component value Adr is read. The read color component value is inputted to the comparator 25.

For example, as shown in FIG. 2, when address is K1, the color component value K2 which is stored in the memory area of this address K1 is read from the look-up table memory part 6. The Cb' calculator 22a calculates the color component value Cb' based on an operational expression of Cb'=B−G, and the Cr' calculator 22b calculates the color component value Cr' based on an operational expression of Cr'=R−G. Then, the color component value Cb' from the Cb' calculator 22a and the color component value Cr' from the Cr' calculator 22b are inputted to the chroma saturation calculator 23, and a larger one of the color component value Cb' and the color component value Cr' is selected and outputted to the comparator 25.

The comparator 25 compares the magnitudes of the color component value from the chroma saturation calculator 23 and the color component value from the look-up table memory part 6. Let the color component value read from the look-up table memory part 6 be K2 and the color component value from the chroma saturation calculator 23 be K3, the comparator 25 will determine which one of K2 and K3 is larger (smaller) than the other. A determination result is outputted to the pixel color re-determination part 30 as a signal (flag) of a level of "0" or "1." That is, in the case of K2<K3, the target pixel is deemed to be the color pixel and a flag set to"1" is outputted, and when K2≧K3, the target pixel is deemed to be the monochrome pixel and a flag set to "0" is outputted.

The color component value Cb' from the Cb' calculator 22a is inputted to the shift register 24a, and the color component value Cr' from the Cr' calculator 22b is inputted to the shift register 24b. In these shift registers 24a and 24b, the color component values Cb' and Cr' are doubled and outputted to the second resolution conversion part 60 as color component values Cb (=2×Cb') and Cr (=2×Cr').

The pixel color re-determination part 30 performs color re-determination to the converted pixel which has been determined to be the color pixel by the pixel color determination part 20 using filters illustrated in FIG. 4 etc. A color re-determination result by the pixel color re-determination part 30 is outputted to the first document color determination part 40 and the second resolution conversion part 60 as a color flag.

Figure 14:
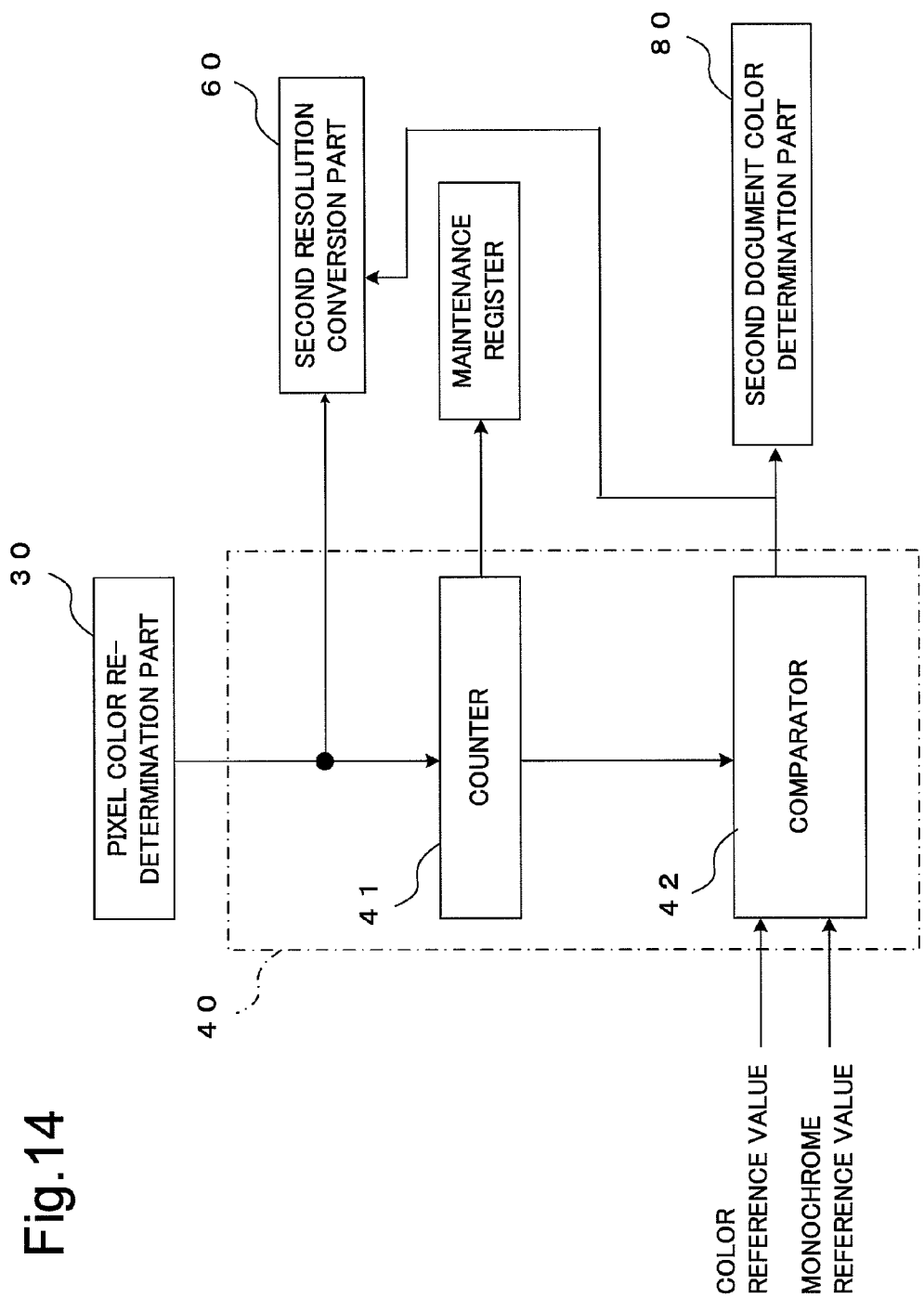
FIG. 14 is a block diagram of a first document color determination part according to the third exemplary embodiment.

FIG. 14 is a block diagram of the first document color determination part 40. The first document color determination part 40 includes a counter 41 and a comparator 42. The counter 41 counts how many filter regions which have been determined to be the color pixel by the pixel color re-determination part 30 are there in the whole converted image data, and outputs the count value to a maintenance register and the comparator 42. The count value stored in the maintenance register is used when performing maintenance.

A color reference value and a monochrome reference value are set to the comparator 42 in advance. When a count value from the counter 41 is inputted, the comparator 42 compares the count value and the color reference value and the monochrome reference value. By this comparison, when a count value is larger than a color reference value, it is determined to be the color document. When the count value is smaller than the monochrome reference value, it is determined to be the monochrome document. On the other hand, when the count value is in between the color reference value and the monochrome reference value, it is determined that color determination of the document is not possible (determination impossible).

When it is determined as determination impossible by the first document color determination part 40, the indefinite image determination part 70 calculates a chroma saturation integrated value in a predetermined area for converted pixels determined to be the color pixel by the pixel color re-determination part 30 using a chroma saturation integrated value filter. Then, color determination of the document is performed by comparing it with a chroma saturation reference value.

At that time, in order to reduce a work memory capacity used in the indefinite image determination part 70, the second resolution conversion part 60 reduces the resolution of color component values Cb, Cr of each converted pixel in a horizontal scanning direction. In order to perform such resolution conversion, the color flag and color component values Cb, Cr are inputted from the pixel color re-determination part 30 to the second resolution conversion part 60, and based on these values, resolution conversion of the color flags and the color component values are performed in the horizontal scanning direction to a predetermined peripheral region centering on the converted pixel which has been determined to be determination impossible by the pixel color re-determination part 30.

Figure 15:
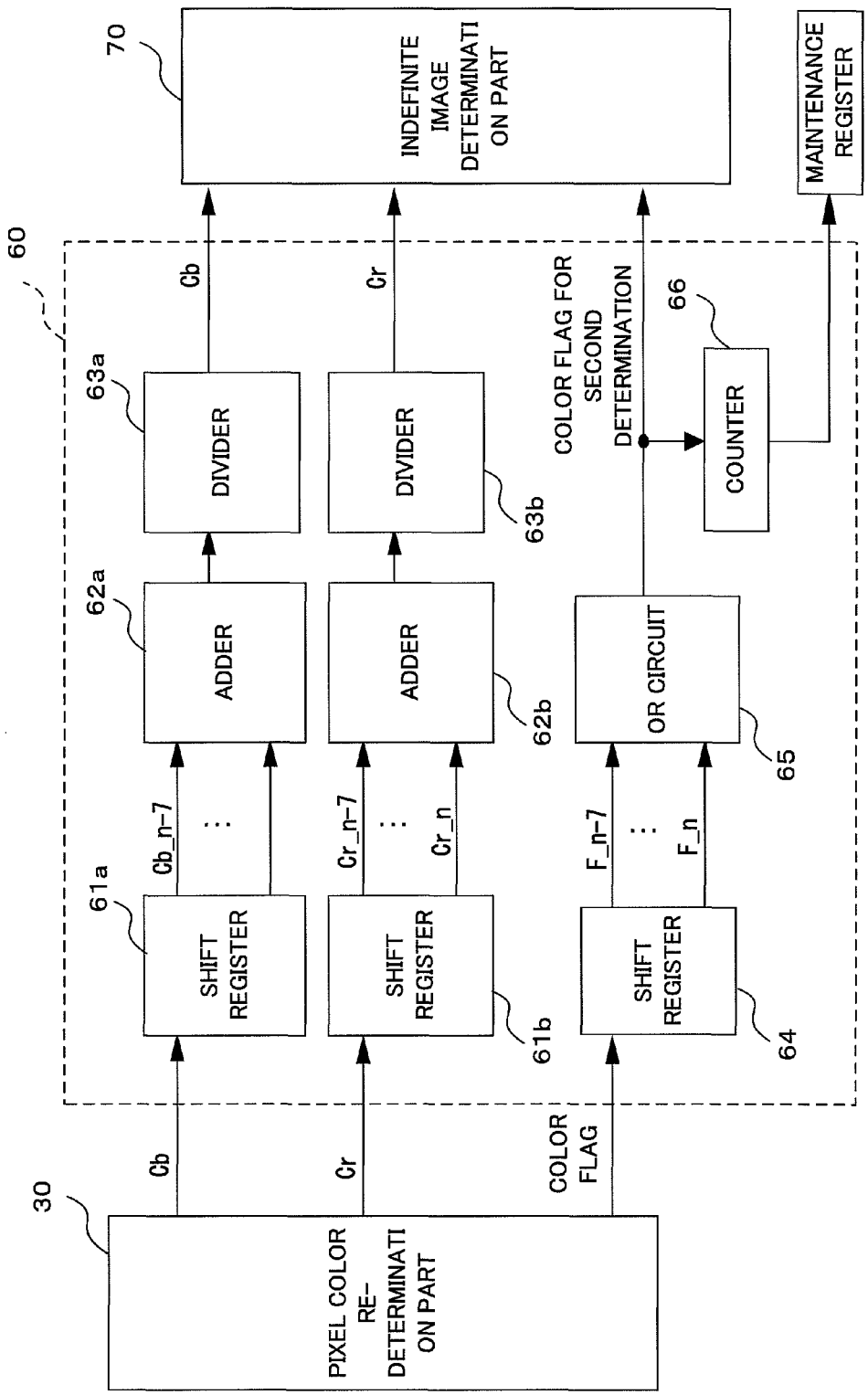
FIG. 15 is a block diagram of a second resolution conversion part according to the third exemplary embodiment.

FIG. 15 is a block diagram of the second resolution conversion part 60. In FIG. 15, although a case where resolution is lowered to ⅛ of its document value is illustrated, it is also possible to lower the resolution to ½, ¼ or the like of the initial value. However, when resolution is reduced too much, an average of an area which is wider by just that much will be taken, and thus determination accuracy of a small color region degrades. Accordingly, it is preferred that an appropriate value is set according to the feature of the document.

The second resolution conversion part 60 includes shift registers 61a and 61b to which the color component values Cb, Cr are inputted, adders 62a and 62b which add the inputted color component values Cb, Cr and dividers 63a and 63b which divide the added color component values Cb, Cr.

The second resolution conversion part 60 also includes: a shift register 64 to which a color flag is inputted; an OR circuit 65 which selects a flag of "1" which indicates a color image, for example, among inputted color flags and outputs it; and a counter 66 which counts outputs from the OR circuit 65.

Color component values $Cb\_n-7, Cb\_n-6, \ldots, Cb\_n$, and color component values $Cr\_n-7, Cr\_n-6, \ldots, Cr\_n$ of eight converted pixels in the horizontal scanning direction centering on the target pixel are inputted from the pixel color re-determination part 30 to the shift registers 61a and 61b. The target pixel at that time is the converted pixel which has been determined to be the color pixel by the pixel color re-determination part 30.

Each color component value inputted to the shift registers 61a and 61b is inputted to the adders 62a and 62b respectively, and is added. After that, the added color component values are inputted to the dividers 63a and 63b, respectively, and are divided. In case of FIG. 15, because color component values of eight converted pixels are added by the adders 62a and 62b, an added color component value is divided by 8 by the dividers 63a and 63b. As a result, resolution conversion of ⅛ has been performed. Meanwhile, although the averaging processing described in FIG. 15 is a so-called simple moving averaging processing, it may be processing by other methods such as a simple skipping and internal division point calculation.

On the other hand, color flags $F\_n-7, F\_n-6 \ldots$ and $F\_n$ of eight converted pixels in a horizontal scanning direction centering on the target pixel are inputted from the pixel color re-determination part 30 to the shift register 64 and then inputted to the OR circuit 65. When at least one flag of "1" which indicates the color pixel exists in the inputted color flags, the OR circuit 65 outputs "1". Hereinafter, this color flag is referred to as a color flag for secondary determination.

The secondary determination color flag outputted from the OR circuit 65 is outputted to the indefinite image determination part 70, and at the same time, the number of converted pixels having the flag value "1" is counted by the counter 66 and is stored in a maintenance register which is not illustrated.

The indefinite image determination part 70 performs assessment by a chroma saturation integrated value. This is performed in order to suppress influence of occurrence of a color shift by integrating chroma saturations, because there are characteristics that an integrated value of chroma saturation approaches "0" when a color shift occurs.

FIG. 16 is a detailed block diagram of the indefinite image determination part 70. The indefinite image determination part 70 includes: line buffers 71a and 71b; 1×7 filter region integrators 72a and 72b; 3×7 filter region integrators 73a and 73b; selectors 74a and 74b; integrated value output determiners 75a and 75b, a maximum value holding register 76, a comparator 77 and a selection information register 78.

Although, in FIG. 16, there is illustrated a case where the indefinite image determination part 70 includes the 1×7 filter region integrators 72a and 72b and the 3×7 filter region integrators 73a and 73b, it may include either one of the filter region integrators.

Although a chroma saturation integrated area is not limited to such as "one pixel in width×seven pixels in height", it is preferred to set it according to the situation because, when it is set as a large area, a large memory area (the capacity of the line buffers 71a and 71b) is needed at the time of data processing and it becomes a factor of processing speed degradation. The above mentioned "one pixel in width×seven pixels" in height and "three pixels in width×seven pixels" in height are values which have been obtained, as a result of an actual experiment, as experimental conditions which do not cause degradation of processing speed with a small memory area and, at the same time, do not deteriorate determination accuracy.

With such structure, chroma saturations Cb, Cr are inputted from the second resolution conversion part 60 to the line buffers 71a and 71b, the 1×7 filter region integrators 72a and 72b and the 3×7 filter region integrators 73a and 73b. The 1×7 filter region integrators 72a and 72b and the 3×7 filter region integrators 73a and 73b integrate the chroma saturations Cb, Cr using the line buffers 71a and 71b as a work memory.

FIG. 17A is a map of color flags for secondary determination at the time of integrating the chroma saturations Cb, Cr by the 3×7 filter region integrators 73a and 73b, and FIG. 17B is a diagram which indicates expressions of the chroma saturations Cb, Cr in each converted pixel. In FIG. 17 A, it is shown that calculation of a chroma saturation integrated value is performed to a chroma saturation integrated area J of three pixels in width seven pixels in height surrounded by a thick line.

When the chroma saturations of each converted pixel in this chroma saturation integrated area J are described as Cb (0, 0), Cb (0, 1) . . . , Cb (6, 2), Cr (0, 0) and Cr (0, 1) . . . Cr (6, 2) as shown in FIG. 17B, chroma saturation integrated values of the 3×7 filter region integrators 73a and 73b are calculated as follows based on the formula 1 and the formula 2.

$$SUM\_Cb = Cb(0,0) + Cb(0,1) + \ldots + Cb(6,2) \quad (1)$$

$$SUM\_Cr = Cr(0,0) + Cr(0,1) + \ldots + Cr(6,2) \quad (2)$$

To the selectors 74a and 74b, output chroma saturation integrated values SUM_Cb and SUM_Cr are inputted from the 1×7 filter region integrators 72a and 72b and the 3×7 filter region integrators 73a and 73b, respectively, and a select signal is inputted from the selection information register 78. This select signal is a signal set by a user or the like and designates which integrated value of the 1×7 filter region integrators 72a and 72b and the 3×7 filter region integrators 73a and 73b is used.

The chroma saturation integrated values SUM_Cb and SUM_Cr selected by the selectors 74a and 74b are inputted to the integrated value output determiners 75a and 75b. A secondary determination color flag is inputted from the second resolution conversion part 60 to this integrated value output determiners 75a and 75b.

Accordingly, the integrated value output determiners 75a and 75b outputs the chroma saturation integrated values SUM_Cb and SUM_Cr to the maximum value holding register 76 when the secondary determination color flag is "1".

Output from the integrated value output determiners 75a and 75b is inputted to the maximum value holding register 76, and in this maximum value holding register 76, a larger one of the chroma saturation integrated values SUM_Cb and SUM_Cr (hereinafter, described as chroma saturation maximum absolute value) is selected and held. The selected chroma saturation integrated value is outputted to the comparator 77 and a register for maintenance.

To the comparator 77, a chroma saturation integrated value from the maximum value holding register 76 is inputted and a chroma saturation reference value is inputted from a register. Accordingly, the comparator 77 compares the chroma saturation reference value and the chroma saturation integrated value from the maximum value holding register 76. The comparator 77 outputs a signal indicating the color pixel, when a chroma saturation integrated value from the maximum value holding register 76 is larger than the chroma saturation reference value, and outputs a signal indicating the monochrome pixel when it is smaller than the chroma saturation reference value.

The second document color determination part 80 integrates determination results of the pixel color re-determination part 30 and the indefinite image determination part 70 and outputs the integrated result.

Figure 18:
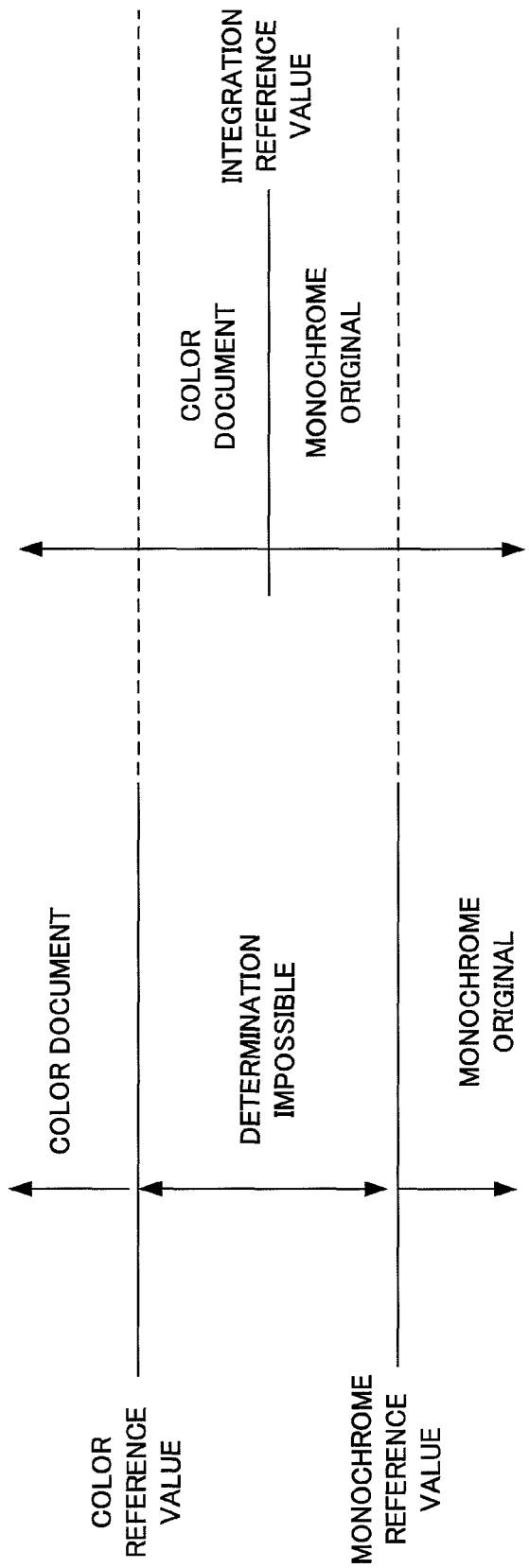
FIG. 18 is a diagram which integrates determination results in a pixel color re-determination unit and an indefinite image determination part in the third exemplary embodiment.

FIG. 18 is a diagram collectively showing determination results in the pixel color re-determination part 30 and the indefinite image determination part 70. Here, it is indicated that, by comparing a chroma saturation reference value and a chroma saturation maximum absolute value in the indefinite image determination part 70, it is possible to perform color determination to the converted pixel which has been determined as being determination impossible by the pixel color re-determination part 30.

Accordingly, when being determined as a color image or the monochrome image by the pixel color re-determination part 30, the second document color determination part 80 adopts this color determination, and when judged as being color determination impossible by the pixel color re-determination part 30, it adopts a determination result of the indefinite image determination part 70.

In the above-mentioned description, when being determined as determination impossible in the first document color determination part 40, the indefinite image determination unit 50 performs color determination of such document. However, this exemplary embodiment is not limited to this. For example, the indefinite image determination unit 50 may perform color determination of the document based on a determination result of the pixel color re-determination part 30, and output the result to the second document color determination part 80. Then, when a determination result from the first document color determination part 40 is "determination impossible", the indefinite image determination unit 50 adopts a determination result of the second document color determination part 80.

Thus, by the indefinite image determination unit 50 performing determination processing in parallel with the first document color determination part 40, the indefinite image determination unit 50 can perform color determination of the document based on a determination result of the pixel color re-determination part 30 without waiting for a determination result of the first document color determination part 40. As a result, reduction of work memories such as a line memory needed in determination processing of the indefinite image determination unit 50 becomes possible.

As mentioned above, by a simple structure to which just a chroma saturation integrated value filter is added, proper color determination becomes possible even for the document which cannot be color-determined by color determination and color re-determination. Accordingly, highly reliable color determination becomes possible by only small circuit size hardware.

The features of the present invention are summarized below.

(Additional Statement 1)

A color determining apparatus which determines whether an document is a color document or a monochrome document based on image data of the document including a plurality of pixel data, comprising:

a pixel color determination part which performs color determination of pixels based on a luminance component value and a color component value of the pixel data;

a pixel color re-determination part which set one of the pixels determined to be a color pixel by the pixel color determination part a target pixel in turn, and at a time when a plurality of filters having different outline shapes are applied to the target pixel, performs color re-determination of the target pixel according to whether all of the pixels included in the filter are determined to be a color pixel or not by the pixel color determination part; and a first document color determination part that determines whether the document is color or monochrome by comparison of a number of the pixels determined to be a color pixel by the pixel color re-determination part and a reference value set in advance.

(Additional Statement 2)

The color determining apparatus according to additional statement 1, further comprising a first resolution conversion part that converts the image data into image data having a resolution lower than that of the image data and outputs the converted image data to the pixel color determination part.

(Additional Statement 3)

The color determining apparatus according to additional statement 1 or 2, wherein the first document color determination part determines whether the document is color or monochrome by a color reference value and a monochrome reference value, and at that time, the first document color determination part determines that: when the number of the pixels is larger than the color reference value, the document is a color image; when the number of the pixels is smaller than the monochrome reference value, the document is a monochrome image; and when the number of the pixels is in between the color reference value and the monochrome reference value, the document is determination impossible.

(Additional Statement 4)

The color determining apparatus according to any one of additional statements 1 to 3, wherein the pixel color re-determination part performs color re-determination of the target pixel a plurality of times using the plurality of filters having different profile shapes.

(Additional Statement 5)

The color determining apparatus according to any one of additional statements 1 to 4, wherein the filters used by the pixel color re-determination part when performing the color re-determination include a planar-shaped filter with a profile shape having a two-dimensional expanse.

(Additional Statement 6)

The color determining apparatus according to any one of additional statements 1 to 5, wherein the filter which the pixel color re-determination part uses when performing the color re-determination is designated by a user according to a feature of a document.

(Additional Statement 7)

The color determining apparatus according to any one of additional statements 4 to 6, wherein the pixel color re-determination part re-determines the target pixel as a color pixel when being re-determined as a color pixel by at least one the filter.

(Additional Statement 8)

The color determining apparatus according to any one of additional statements 2 to 7, wherein the resolution conversion part includes a characteristic value calculation part which processes R, G, B values of the pixel data in a predetermined range statistically, and calculates resolution-converted R, G, B values of the pixel.

(Additional Statement 9)

The color determining apparatus according to any one of additional statements 2 to 7, wherein the resolution conversion part includes a characteristic value calculation part which converts R, G, B values of the pixel data in a predetermined range into quantized Y, Cb, Cr values, and processes the Y, Cb, Cr values statistically to calculate resolution-converted R, G, B values of the pixel.

(Additional Statement 10)

The color determining apparatus according to any one of additional statements 2 to 9, wherein the resolution conversion part includes a region removing part which removes data of a peripheral region of the image data.

(Additional Statement 11)

The color determining apparatus according to any one of additional statements 3 to 10, comprising an indefinite image determination part which calculates a chroma saturation integrated value of a converted pixel determined to be a color pixel by the pixel color re-determination part, and determines: when the chroma saturation integrated value is larger than a chroma saturation reference value set in advance, as a color document; and when smaller than the chroma saturation reference value, as a monochrome document.

(Additional Statement 12)

The color determining apparatus according to additional statement 11, wherein the indefinite image determination part calculates the chroma saturation integrated value according to an integration method designated among a plurality of integration methods.

(Additional Statement 13)

An image processing apparatus, comprising: an image reading unit which reads an image of a document and outputs image data;

a color determining apparatus according to any one of additional statements 1 to 12 which determines whether the document is color or monochrome based on the image data; and an image forming unit which forms an image of the image data according to a determination result of the color determining apparatus.

(Additional Statement 14)

A color determining method for determining whether an document is a color document or a monochrome document based on image data of the document including a plurality of pixel data, comprising:

a pixel color determination procedure for performing color determination of pixels based on a luminance component value and a color component value of the pixel data;

a pixel color re-determination procedure for setting one of the pixels determined to be a color pixel in the pixel color determination procedure a target pixel in turn, and at a time when a plurality of filters having different outline shapes are applied to the target pixel, performing color re-determination of the target pixel according to whether all of the pixels included in the filter are determined to be a color pixel or not in the pixel color determination procedure; and a first document color determination procedure for determining whether the document is color or monochrome by comparison of a number of the pixels determined to be a color pixel in the pixel color re-determination procedure and a reference value set in advance.

(Additional Statement 15)

The color determining method according to additional statement 14, further comprising:

a first resolution conversion procedure that converts the image data into image data having a resolution lower than that of the image data and outputs the converted image data to the pixel color determination procedure.

(Additional Statement 16)

The color determining method according to additional statement 14 or 15, wherein the first document color determination part determines whether the document is color or monochrome by a color reference value and a monochrome reference value, and wherein the first document color determination part determines that: when the number of the pixels is larger than the color reference value, the document is a color image; when the number of the pixels is smaller than the monochrome reference value, the document is a monochrome image; and when the number of the pixels is in between the color reference value and the monochrome reference value, the document is determination impossible.

(Additional Statement 17)

The color determining method according to any one of additional statements 14 to 16, wherein the pixel color re-determination procedure performs color re-determination of the target pixel a plurality of times using a plurality of the filters having different profile shapes.

(Additional Statement 18)

The color determining method according to any one of additional statements 14 to 17, wherein the filters used by the pixel color re-determination procedure when performing the color re-determination include a planar-shaped filter with a profile shape having a two-dimensional expanse.

(Additional Statement 19)

The color determining method according to additional statements 17 or 18, wherein the pixel color re-determination procedure re-determines the target pixel as a color pixel when being re-determined as a color pixel by at least one the filter.

(Additional Statement 20)

The color determining method according to any one of additional statements 15 to 18, wherein the first resolution conversion procedure includes a characteristic value calculation procedure which processes R, G, B values of the pixel data in a predetermined range statistically, and calculates resolution-converted R, G, B values of the pixel.

(Additional Statement 21)

The color determining method according to any one of additional statements 15 to 18, wherein the first resolution conversion procedure includes a characteristic value calculation procedure which converts R, G, B values of the pixel data in a predetermined range into quantized Y, Cb, Cr values, and processes the Y, Cb, Cr values statistically to calculate resolution-converted R, G, B values of the pixel.

(Additional Statement 22)

The color determining method according to any one of additional statements 15 to 21, wherein the first resolution conversion procedure includes a region removing procedure for removing data of a peripheral region of the image data.

(Additional Statement 23)

The color determining method according to any one of additional statements 16 to 22, wherein an indefinite image determination procedure for calculating a chroma saturation integrated value of a converted pixel determined to be a color pixel by the pixel color re-determination procedure, and when the chroma saturation integrated value is larger than a chroma saturation reference value which has been set in advance, determining as a color document, and when smaller than the chroma saturation reference value, determining as a monochrome document.

(Additional Statement 24)

The color determining method according to additional statement 23, wherein the indefinite image determination procedure calculates the chroma saturation integrated value according to an integration method designated among a plurality of integration methods.

(Additional Statement 25)

A program for making a program control processor carry out color determining processing for determining whether an document is a color document or a monochrome document based on image data of the document including a plurality of pixel data, comprising:

a pixel color determination step for performing color determination of pixels based on a luminance component value and a color component value of the pixel data;

a pixel color re-determination step for setting one of the pixels determined to be a color pixel in the pixel color determination step a target pixel in turn, and at a time when a plurality of filters having different outline shapes are applied to the target pixel, performing color re-determination of the target pixel according to whether all of the pixels included in the filter are determined to be a color pixel or not in the pixel color determination step; and a first document color determination step for determining whether the document is color or monochrome by comparison of a number of the pixels determined to be a color pixel in the pixel color re-determination step and a reference value set in advance.

(Additional Statement 26)

The color determination program according to additional statement 25, further comprising:

a first resolution conversion step for converting the image data into image data having a resolution lower than that of the image data and outputting the converted image data to the pixel color determination part.

(Additional Statement 27)

The color determination program according to additional statement 25 or 26, wherein the first document color determination step determines whether the document is color or monochrome by a color reference value and a monochrome reference value, and the first document color determination step determines that: when the number of the pixels is larger than the color reference value, the document is a color image; when the number of the pixels is smaller than the monochrome reference value, the document is a monochrome image; and when the number of the pixels is in between the color reference value and the monochrome reference value, the document is determination impossible.

(Additional Statement 28)

The color determination program according to any one of additional statements 25 to 27, wherein the pixel color re-determination step performs color re-determination of the target pixel a plurality of times using the plurality of filters having different profile shapes.

(Additional Statement 29)

The color determination program according to any one of additional statements 25 to 28, wherein the filters used by the pixel color re-determination step when performing the color re-determination include a planar-shaped filter with a profile shape having a two-dimensional expanse.

(Additional Statement 30)

The color determination program according to any one of additional statements 28 to 29, wherein the pixel color re-determination step re-determines the target pixel as a color pixel when being re-determined as a color pixel by at least one the filter.

(Additional Statement 31)

The color determination program according to any one of additional statements 26 to 30, wherein the first resolution conversion step includes a characteristic value calculation step for processing R, G, B values of the pixel data in a predetermined range statistically, and calculating resolution-converted R, G, B values of the pixel.

(Additional Statement 32)

The color determination program according to any one of additional statements 26 to 30, wherein the first resolution conversion step includes a characteristic value calculation step for converting R, G, B values of the pixel data in a predetermined range into quantized Y, Cb, Cr values, and processing the Y, Cb, Cr values statistically to calculate resolution-converted R, G, B values of the pixel.

(Additional Statement 33)

The color determination program according to any one of additional statements 25 to 32, wherein the first resolution conversion step includes a region removing step for removing data of a peripheral region of the image data.

(Additional Statement 34)

The color determination program according to any one of additional statements 26 to 33, wherein an indefinite image determination step for calculating a chroma saturation integrated value of a converted pixel determined to be a color pixel by the pixel color re-determination part, and determining: when the chroma saturation integrated value is larger than a chroma saturation reference value set in advance, as a color document; and when smaller than the chroma saturation reference value, as a monochrome document.

(Additional Statement 35)

The color determination program according to additional statement 34, wherein the indefinite image determination step calculates the chroma saturation integrated value according to an integration method designated among a plurality of integration methods.

Various modifications which a person skilled in the art can understand can be made to the composition and details of the present invention within the scope of the present invention. This application claims priority based on Japanese application Japanese Patent Application No. 2009-202233 filed on Sep. 2, 2009, the disclosure of which is incorporated herein in its entirety.

The invention claimed is:

1. A color determining apparatus which determines whether an document is a color document or a monochrome document based on image data of the document including a plurality of pixel data, comprising:

a pixel color determination part which performs color determination of pixels based on a luminance component value and a color component value of the pixel data;

a pixel color re-determination part which set one of the pixels determined to be a color pixel by the pixel color determination part a target pixel in turn, and at a time when a plurality of filters having different outline shapes are applied to the target pixel, performs color re-determination of the target pixel according to whether all of the pixels included in the filter are determined to be color pixels or not by the pixel color determination part; and a first document color determination part that determines whether the document is color or monochrome by comparison of a number of the pixels determined to be color pixels by the pixel color re-determination part and a reference value set in advance.

2. The color determining apparatus according to claim 1, further comprising a first resolution conversion part that converts the image data into image data having a resolution lower than that of the image data and outputs the converted image data to the pixel color determination part.

3. The color determining apparatus according to claim 2, wherein the first resolution conversion part includes a region removing part which removes data of a peripheral region of the image data.

4. The color determining apparatus according to claim 1, wherein the first document color determination part determines whether the document is color or monochrome by a color reference value and a monochrome reference value, wherein the first document color determination part determines that:

when the number of the pixels is larger than the color reference value, the document is a color image;

when the number of the pixels is smaller than the monochrome reference value, the document is a monochrome image; and when the number of the pixels is in between the color reference value and the monochrome reference value, the document is determination impossible.

5. The color determining apparatus according to claim 4, further comprising
an indefinite image determination part which calculates a chroma saturation integrated value of a converted pixel determined to be a color pixel by the pixel color re-determination part, and when the chroma saturation integrated value is larger than a chroma saturation reference value which has been set in advance, determines as a color document, and when smaller than the chroma saturation reference value, determines as a monochrome document.

6. The color determining apparatus according to claim 5, wherein
the indefinite image determination part calculates the chroma saturation integrated value according to an integration method designated among a plurality of integration methods.

7. The color determining apparatus according to claim 1, wherein
the filters used by the pixel color re-determination part when performing the color re-determination include a planar-shaped filter with a profile shape having a two-dimensional expanse.

8. An image processing apparatus, comprising: an image reading unit which reads an image of a document and outputs image data;
a color determining apparatus according to claim 1 which determines whether the document is color or monochrome based on the image data; and
an image forming unit which forms an image of the image data according to a determination result of the color determining apparatus.

9. A color determining method for determining whether an document is a color document or a monochrome document based on image data of the document including a plurality of pixel data, comprising:
a pixel color determination procedure for performing color determination of pixels based on a luminance component value and a color component value of the pixel data;
a pixel color re-determination procedure for setting one of the pixels determined to be a color pixel in the pixel color determination procedure a target pixel in turn, and at a time when a plurality of filters having different outline shapes are applied to the target pixel, performing color re-determination of the target pixel according to whether all of the pixels included in the filter are determined to be a color pixel or not in the pixel color determination procedure; and
a first document color determination procedure for determining whether the document is color or monochrome by comparison of a number of the pixels determined to be a color pixel in the pixel color re-determination procedure and a reference value set in advance.

10. A non-transitory computer-readable medium for making a program control processor carry out color determining processing for determining whether an document is a color document or a monochrome document based on image data of the document including a plurality of pixel data, comprising:
a pixel color determination step for performing color determination of pixels based on a luminance component value and a color component value of the pixel data;
a pixel color re-determination step for setting one of the pixels determined to be a color pixel in the pixel color determination step a target pixel in turn, and at a time when a plurality of filters having different outline shapes are applied to the target pixel, performing color re-determination of the target pixel according to whether all of the pixels included in the filter are determined to be a color pixel or not in the pixel color determination step; and
a first document color determination step for determining whether the document is color or monochrome by comparison of a number of the pixels determined to be a color pixel in the pixel color re-determination step and a reference value set in advance.

* * * * *